(12) United States Patent
Kim et al.

(10) Patent No.: US 10,425,140 B2
(45) Date of Patent: Sep. 24, 2019

(54) BEAMFORMING METHOD AND DEVICE THEREFOR

(71) Applicants: LG ELECTRONICS INC., Seoul (KR); KOREA ADVANCED INSTITUTE OF SCIENCE AND TECHNOLOGY, Daejeon (KR)

(72) Inventors: Kitae Kim, Seoul (KR); Sae-Young Chung, Daejeon (KR); Wonseok Jeon, Daejeon (KR); Jinhak Kim, Daejeon (KR); Jiwon Kang, Seoul (KR)

(73) Assignees: LG ELECTRONICS INC., Seoul (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 16/076,625

(22) PCT Filed: Mar. 9, 2016

(86) PCT No.: PCT/KR2016/002347
§ 371 (c)(1),
(2) Date: Aug. 8, 2018

(87) PCT Pub. No.: WO2017/155137
PCT Pub. Date: Sep. 14, 2017

(65) Prior Publication Data
US 2019/0044594 A1 Feb. 7, 2019

(51) Int. Cl.
*H05B 7/06* (2006.01)
*H04B 7/06* (2006.01)
*H04B 7/0456* (2017.01)

(52) U.S. Cl.
CPC ......... *H04B 7/0617* (2013.01); *H04B 7/0456* (2013.01); *H04B 7/0691* (2013.01); *H04B 7/0695* (2013.01)

(58) Field of Classification Search
CPC .. H04B 7/0617; H04B 7/0691; H04B 7/0456; H04B 7/0695
(Continued)

(56) References Cited

U.S. PATENT DOCUMENTS 8,787,343 B2 * 7/2014 Taghavi Nasrabadi .....................
H04B 7/0851
370/310
9,184,815 B2 * 11/2015 Wang ................... H04B 7/0617
(Continued)

FOREIGN PATENT DOCUMENTS

KR  1020130021919  3/2013

OTHER PUBLICATIONS

PCT International Application No. PCT/KR2016/002347, Written Opinion of the International Searching Authority dated Nov. 24, 2016, 21 pages.

*Primary Examiner* — Juan A Torres
(74) *Attorney, Agent, or Firm* — Lee Hong Degerman Kang Waimey

(57) ABSTRACT

The present invention relates to a method for performing beamforming by using circular array antenna comprising a plurality of antennas, and a device therefor, and to a method and a device therefor, the method comprising the steps of: determining the number of operating antennas for a specific beam pattern; selecting at least one antenna among the plurality of antennas by using the determined number of operating antennas; and transmitting a signal through the selected at least one antenna, wherein the step of determining the number of operating antennas determines the number of operating antennas by using the inverse number of the square of the vertical beam width of the specific beam pattern.

11 Claims, 9 Drawing Sheets

(58) Field of Classification Search
USPC .......................................................... 375/267
See application file for complete search history.

(56) References Cited

U.S. PATENT DOCUMENTS

| | | | |
|---|---|---|---|
| 2002/0180639 A1* | 12/2002 | Rickett | H01Q 3/22 |
| | | | 342/372 |
| 2004/0014502 A1 | 1/2004 | Shurvinton et al. | |
| 2010/0117913 A1* | 5/2010 | Jung | H01Q 1/246 |
| | | | 343/724 |
| 2012/0299765 A1 | 11/2012 | Huang et al. | |
| 2013/0057432 A1 | 3/2013 | Rajagopal et al. | |
| 2015/0264579 A1 | 9/2015 | Claussen | |
| 2017/0264355 A1* | 9/2017 | Zhang | H04J 11/003 |

* cited by examiner (a)

(b)

BEAMFORMING METHOD AND DEVICE THEREFOR

CROSS-REFERENCE TO RELATED APPLICATIONS

This application is the National Stage filing under 35 U.S.C. 371 of International Application No. PCT/KR2016/002347, filed on Mar. 9, 2016, the contents of which are hereby incorporated by reference herein in its entirety.

TECHNICAL FIELD

The present invention relates to a wireless communication system, more specifically, relates to a method for beamforming using an array antenna and an apparatus therefor.

BACKGROUND ART

Due to the rapid development of mobile technology, the demand of wireless data traffic has rapidly increased. As a technology capable of handling the demand, the array antenna has attracted significant attention in the wireless communication community. The array antenna technology can minimize the impact of interference signals on the receiving end by forming optimal beams in desired directions, thereby improving the communication stability and capacity. However, to create optimal beams in desired directions by using the array antenna, a method for controlling beam patterns is required.

The present invention is directed to a method for controlling beam patterns by using an array antenna and apparatus therefor.

DISCLOSURE OF THE INVENTION

Technical Task

An object of the present invention is to provide a method for performing beamforming by using an array antenna and apparatus therefor.

Another object of the present invention is to provide a method for controlling beam patterns by using an array antenna and apparatus therefor.

A further object of the present invention is to provide a method for controlling beam widths by using a circular array antenna and apparatus therefor.

Still another object of the present invention is to provide a method for controlling beam widths by considering antenna coupling of an array antenna and apparatus therefor.

Still a further object of the present invention is to provide a method for determining operating antennas of a circular array antenna to achieve efficient beamforming and apparatus therefor.

Yet still another object of the present invention is to provide a precoding method for controlling the beam widths formed by a circular array antenna and apparatus therefor.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In a first aspect of the present invention, provided herein is a method for performing beamforming by using a circular array antenna comprising a plurality of antennas, the method comprising: determining a number of operating antennas for a specific beam pattern; selecting at least one antenna from among the plurality of antennas by using the determined number of operating antennas; and transmitting a signal via the selected at least one antenna, wherein determining the number of operating antennas comprises determining the number of operating antennas by using a reciprocal of a square of a vertical beam width of the specific beam pattern.

In a second aspect of the present invention, provided herein is a communication apparatus for performing beamforming, the communication apparatus comprising: a circular array antenna comprising a plurality of antennas; and a processor, wherein the processor is configured to: determine a number of operating antennas corresponding to a beam pattern for the beamforming; select as many antennas as the number of operating antennas from among the plurality of antenna; transmit a signal via the selected antennas, wherein determining the number of operating antennas comprises determining the number of operating antennas by using a reciprocal of a square of a vertical beam width of the beam pattern.

Preferably, determining the number of operating antennas further comprises determining the number of operating antennas by using a reciprocal of a horizontal beam width of the beam pattern.

Preferably, the number of operating antennas is determined to be one of divisors of a number of the plurality of antennas included in the circular array antenna.

Preferably, the selected antenna satisfies circular symmetry in the circular array antenna.

Preferably, transmitting the signal comprises: precoding the signal based on the number of operating antennas, a horizontal direction of the beam pattern, a radius of the circular array antenna, and a wavelength of the signal; and transmitting the precoded signal via the selected antenna.

Preferably, when a spacing between the operating antennas is equal to or more than a half of the wavelength of the signal, the signal is precoded using the following equations:

$$z = G^H x$$

$$G = [g_1 \ g_2 \ \cdots \ g_a]$$

$$g_i = e^{j\frac{2\pi}{\lambda} R \cos(\phi_0 - \frac{2\pi i}{a})}, 1 \leq i \leq a$$

where x is the signal, z is the precoded signal, a is the number of operating antennas, $\lambda$ is the wavelength of the signal, $\phi_0$ is the horizontal direction of the beam pattern, R is the radius of the circular array antenna, and $G^H$ is a complex conjugate transpose matrix of G.

Preferably, when the spacing between the operating antennas is less than the half of the wavelength of the signal, precoding the signal comprises: performing a Fourier transform on the signal; multiplying the Fourier-transformed signal by a diagonal matrix; and performing the Fourier transform on the signal multiplied by the diagonal matrix.

Preferably, the Fourier transform is performed by using an a×a Fast Fourier Transform (FFT) matrix, and wherein an element $w_{uv}^{(a)}$ at the u-th row and v-th column of the FFT matrix is given by the following equation:

$$w_{uv}^{(a)} = \frac{1}{\sqrt{a}} e^{-\frac{j2\pi(u-1)(v-1)}{a}}, 1 \leq u \leq a, 1 \leq v \leq a.$$

Preferably, the diagonal matrix is given by the following equations:

$$\mathrm{diag}(\sqrt{\alpha}[W^{(a)}]^{-1}c^T)$$

$$c=[c_1 c_2 \ldots c_\alpha]$$

where $W^{(a)}$ is the FFT matrix, T is a transpose operator, and diag( ) is a function for generating a diagonal matrix by arranging elements of a vector at diagonal positions of the diagonal matrix.

Preferably, when the spacing between the operating antennas is less than the half of the wavelength of the signal, the signal is precoded according to the following equations:

$$z = (C^{-1}G^H)x$$

$$G = [\,g_1 \quad g_2 \quad \cdots \quad g_a\,]$$

$$g_i = e^{j\frac{2\pi}{\lambda}R\cos(\phi_0 - \frac{2\pi i}{a})}, 1 \le i \le a$$

$$C = \begin{bmatrix} c_1 & c_2 & \cdots & c_a \\ c_a & c_1 & \cdots & c_{a-1} \\ \vdots & \vdots & \vdots & \vdots \\ c_2 & \cdots & c_a & c_1 \end{bmatrix}$$

$$c_i = \frac{3}{2}\left(\frac{\sin d_i}{d_i} + \frac{\cos d_i}{d_i^2} - \frac{\sin d_i}{d_i^3}\right), d_i = \frac{4\pi}{\lambda}R\sin\left(\frac{i\pi}{a}\right), 1 \le i \le a$$

where x is the signal, z is the precoded signal, a is the number of operating antennas, $\lambda$ is the wavelength of the signal, $\phi_0$ is the horizontal direction of the beam pattern, $G^H$ is a complex conjugate transpose matrix of G, and $C^{-1}$ is an inverse matrix of C.

Advantageous Effects

According to the present invention, it is possible to achieve efficient beamforming by using an array antenna.

In addition, according to the present invention, beam patterns can be effectively controlled by using an array antenna.

Moreover, according to the present invention, beam widths can be effectively controlled by using a circular array antenna.

Further, according to the present invention, it is possible to effectively control beam widths by considering antenna coupling of an array antenna.

Further, according to the present invention, operating antennas of a circular array antenna can be determined in an efficient manner.

Further, according to the present invention, it is possible to effectively control the beam widths formed by a circular array antenna through precoding.

It will be appreciated by persons skilled in the art that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

BEST MODE FOR INVENTION

Figure 1:
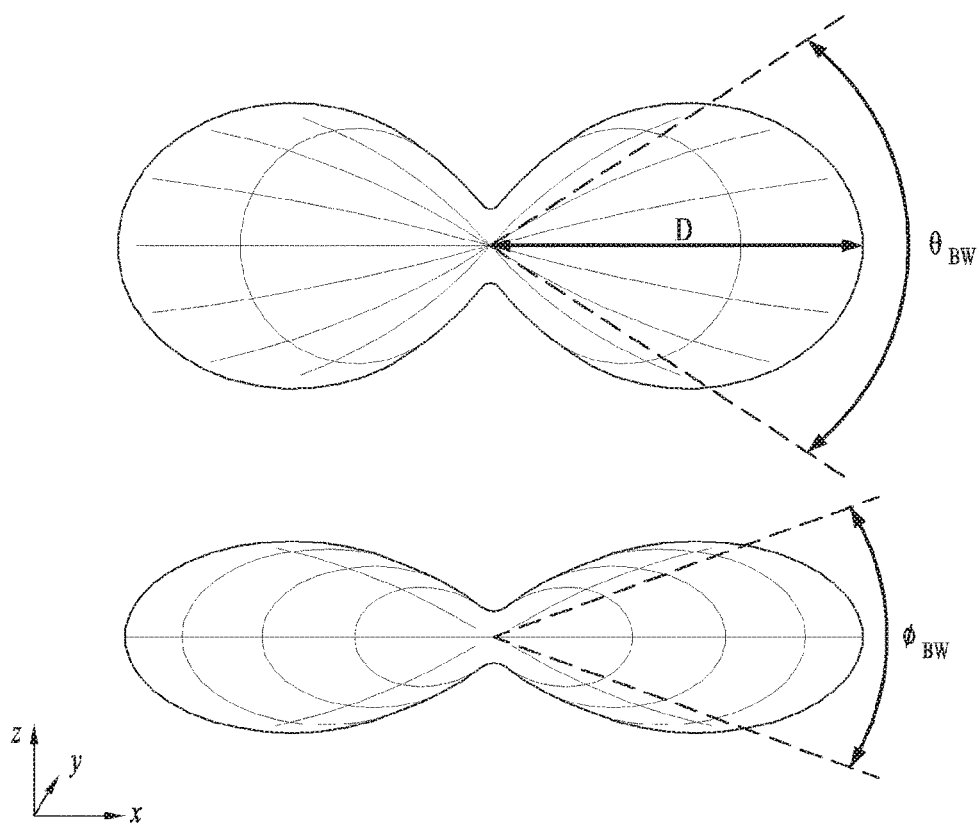
FIG. 1 illustrates the directivity and beam width for a specific beam pattern.

In the present invention, a user equipment (UE) may be a fixed or mobile apparatus. Examples of the UE include various devices that transmit and receive data and/or control information to and from a base station (BS). The UE may be referred to as a terminal, a mobile station (MS), a mobile terminal (MT), a user terminal (UT), a subscriber station (SS), a wireless device, a personal digital assistant (PDA), a wireless modem, a handheld device, etc. In the present specification, the term "UE" may be interchangeably used with the term "terminal".

In addition, in the present invention, a BS generally refers to a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), a processing server (PS), etc. In the present specification, the term "BS" may be interchangeably used with the term "eNB".

In the present invention, a node refers to a fixed point capable of transmitting/receiving radio signals through communication with UEs. Various types of eNBs may be used as nodes irrespective of the terms thereof. For example, the node includes a BS, an NB, an eNB, a pico-cell eNB (PeNB), a home eNB (HeNB), a relay, a repeater, etc. In addition, the node may not be an eNB. For example, the node may be a radio remote head (RRH) or a radio remote unit (RRU). In general, the RRH or RRU has a power level lower than that of the eNB. Since the RRH or RRU (hereinafter referred to as the RRH) is generally connected to the eNB through an ideal backhaul network (e.g., dedicated line such as an optical cable), cooperative communication between the RRH and eNB can be smoothly performed compared to cooperative communication between eNBs connected by a radio interface.

As a physical method for improving communication performance, use of multiple antennas has been researched. The antenna system where a plurality of antennas are arranged in a specific pattern is called an array antenna or antenna array. In this case, the plurality of antennas may be the same unit antennas. For example, the array antenna may include dipole antennas as unit antennas.

The array antenna may be classified as a linear array antenna, a circular array antenna, etc. When a plurality of antennas are arranged in a line at the same spacing, it may be referred to as a linear array antenna or linear antenna array. When a plurality of antennas are arranged in a circle at the same spacing, it may be referred to as a circular array antenna or circular antenna array. The array antenna is used to maximize the directivity of antennas. For example, it may be used to form the beam pattern for beamforming.

To indicate the performance of an array antenna, the directivity and 3 dB beam width (simply, beam width) can be used. The directivity is defined as the ratio of the electromagnetic power density radiated in a specific direction to the antenna radiation power, and the 3 dB beam width is defined as the angle between points on a single plane, where the electromagnetic power density is reduced by 3 dB compared to that radiated in the specific direction. In this specification, the 3 dB beam width can be simply referred to as the beam width. For example, the 3 dB beam width on a plane perpendicular to the ground may be referred to as the beam width in the horizontal direction, and more simply, as the horizontal beam width. Accordingly, the beam pattern formed by the array antenna can be represented by the directivity, beam width (i.e., horizontal beam width and/or vertical beam width).

In this specification, the terms "beam pattern" and "beamforming" indicate the same meaning and are simply referred to as the term "beam". In addition, the beam width is referred to as that of the beam pattern formed by beamforming.

FIG. 1 illustrates the directivity and 3 dB beam width of a specific beam pattern. In FIG. 1, it is assumed that the specific beam pattern is formed along the x-axis direction and the beam pattern is formed such that the power density is widely distributed on the z-x plane and it is narrowly distributed on the x-y plane. The beam pattern shown in FIG. 1 is merely an example, and thus, although the beam pattern is formed in other directions, the directivity and beam width can be determined in the same/similar manner. In addition, it is also assumed in FIG. 1 that the x-y plane is in parallel to the ground.

Referring to FIG. 1, since the electromagnetic power density is illustrated to be radiated in the x-axis direction, the directivity can be denoted by D. In addition, the points where the power density is reduced by 3 dB compared to that radiated in the x-axis direction are represented by dotted lines on each of the z-x and x-y planes. Specifically, the angle between −3 dB points on the z-x plane is denoted by $\theta_{BW}$, and the angle between −3 dB points on the x-y plane is denoted by $\phi_{BW}$. In FIG. 1, since the z-x plane is perpendicular to the ground, $\theta_{BW}$ indicates the beam width in the vertical direction or the vertical beam width. And, since the x-y plane is in parallel to the ground, $\phi_{BW}$ indicates the beam width in the horizontal direction or the horizontal beam width.

Hereinafter, the directivity and beam width (horizontal and/or vertical beam width) of the beam patterns formed by using linear and circular array antennas will be described in detail.

Beam Pattern of Linear Array Antenna

Figure 2:
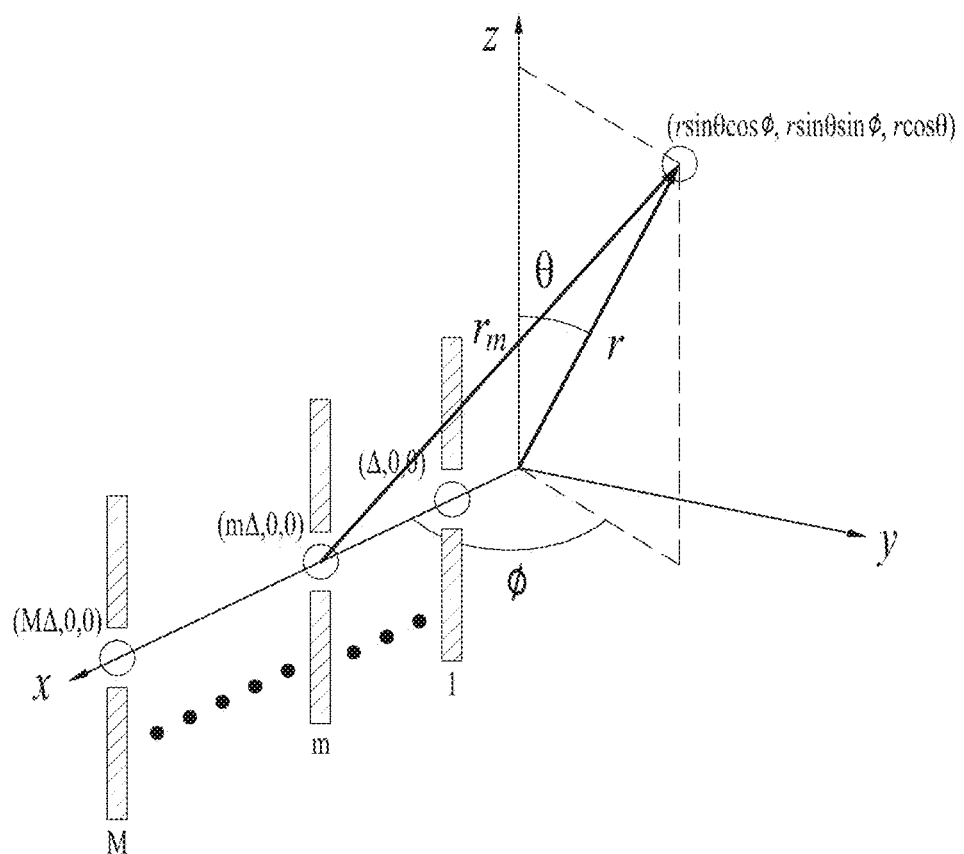
FIG. 2 illustrates a linear array antenna.

FIG. 2 illustrates a linear array antenna. In FIG. 2, it is assumed that the array antenna is composed of short-length lossless dipole antennas (for example, the length of the dipole antenna is much shorter than the wavelength of a transmitted wave (or signal)).

FIG. 2 shows the linear array antenna where M dipole antennas are uniformly arranged at the spacing of $\Delta$ on the x-axis. In this case, the locations of the M dipole antennas can be represented in a three-dimensional coordinate system. For example, the locations of first, mth, and Mth antennas may be represented by $(\Delta, 0, 0)$, $(m\Delta, 0, 0)$, and $(M\Delta, 0, 0)$, respectively. That is, a random point in the three-dimensional space can be represented by r, $\theta$, $\phi$, and in the three-dimensional coordinate system, it may be represented by $(r \sin \theta \cos \phi, r \sin \theta \sin \phi, r \cos \phi)$. Assuming that the random point in the three-dimensional space is far away from the antenna, the relationship of $r \gg M\Delta$ may be satisfied, and far-field approximation can also be applied. The distance between the mth antenna and random point is expressed as $r_m$.

In FIG. 2, assuming that the currents flowing through the first to Mth dipole antennas are $I_1, \ldots, I_M$, the magnetic vector potential can be expressed as shown in Equation 1.

$$A(r, \theta, \phi) = \sum_{m=1}^{M} \frac{\mu_o l I_m}{4\pi r_m} e^{-jkr_m} \hat{z}$$ [Equation 1]

In Equation 1, $\mu_o$ is the magnetic permeability, l is the length of the dipole antenna, and k is the angular frequency, which is $$\frac{2\pi}{\lambda}.$$

If the far-field approximation is applied to Equation 1, the approximation shown in Equation 2 can be obtained.

$r_m \approx r$ $e^{-jkr_m} = e^{-jkr} e^{jkr - r_m} = e^{-jkr} e^{-j k\{(r \sin \theta \cos \phi, r \sin \theta \sin \phi, r \cos \phi) - (m\Delta, 0, 0)\}} \approx e^{-jkr} e^{jkm\Delta \sin \theta \cos \phi}$ [Equation 2]

Thus, when the far-field approximation is applied, the magnetic vector potential of Equation 1 can be approximated as shown in Equation 3 by using Equation 2.

$$A(r, \theta, \phi) \approx \frac{e^{-jkr}}{r} \sum_{m=1}^{M} \frac{\mu_o l I_m e^{jkm\Delta \sin\theta \cos\phi}}{4\pi} \hat{z}$$ [Equation 3]

The electric field can be represented by using the magnetic vector potential $$E(r, \theta, \phi) = \frac{1}{j\omega\mu_0\epsilon_0} \nabla \times \nabla \times A$$ [Equation 4]

When Equation 4 is substituted into Equation 3, it is possible to eliminate the equation for $$\frac{1}{r^2} \text{ and } \frac{1}{r^3}$$

which remains after subtracting the equation reduced to $$\frac{1}{r}$$

by applying the far-field approximation. In this case, the electric field can be represented as shown in Equation 5.

$$E(r, \theta, \phi) = \frac{j\mu_o l \omega e^{-jkr}}{4\pi r} \sum_{m=1}^{M} I_m e^{jkm\Delta \sin\theta\cos\phi} \sin\theta \; \hat{\theta} \quad \text{[Equation 5]}$$

In Equation 5, if the value of r is fixed, the variables before the summation operator become a constant, and the electric field can be represented as shown in Equation 6. In Equation 6, C is $$\frac{j\mu_o l \omega e^{-jkr}}{4\pi r}.$$

$$E(\theta, \phi) = C \sum_{m=1}^{M} I_m e^{jkm\Delta \sin\theta\cos\phi} \sin\theta \; \hat{\theta}. \quad \text{[Equation 6]}$$

Figure 3:
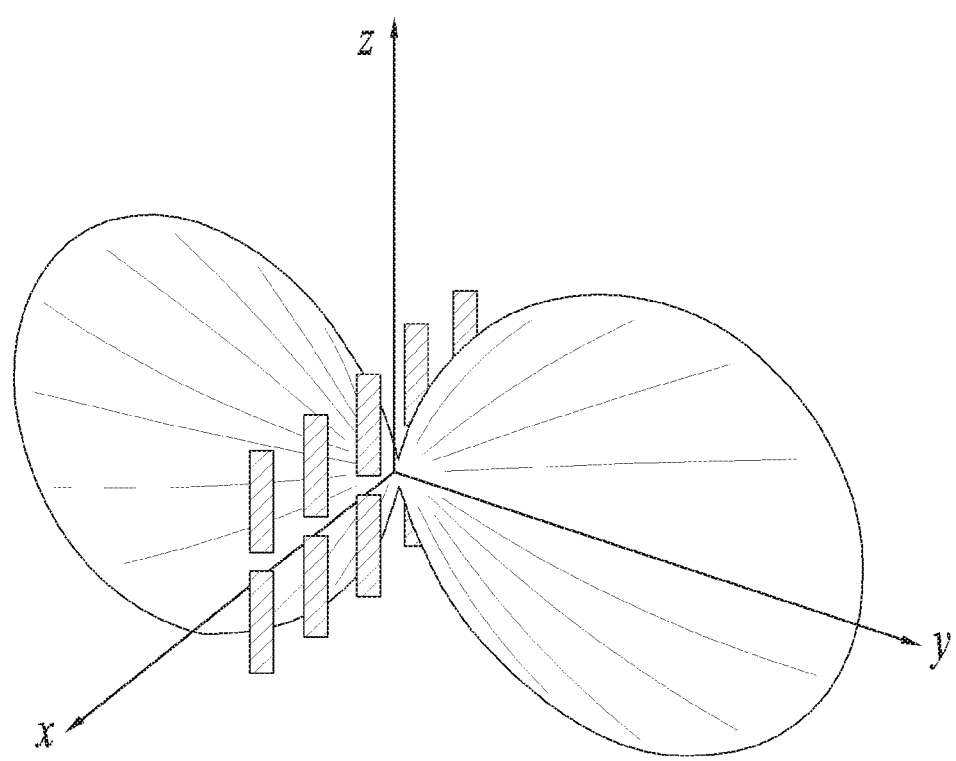
FIG. 3 illustrates a beam pattern when horizontal beamforming is performed by using a linear array antenna.

FIG. 3 illustrates the beam pattern obtained when horizontal beamforming is performed by using a linear array antenna. The horizontal beamforming means that beamforming is applied in the direction perpendicular to that in which dipole antennas of the linear array antenna are arranged. For example, if the dipole antennas of the linear array antenna are arranged in the x-axis direction, the horizontal beamforming may mean that the beamforming is applied in the y-axis direction. Although FIG. 3 shows five antennas for clarity, the invention is not limited thereto. The same/similar principle can be applied when there are M antennas.

FIG. 3 shows the beam pattern $|E(\theta, \phi)|^2$ that is formed in the horizontal direction by using the linear array antenna composed of M antennas. When the horizontal beamforming is performed, all current input values may be configured such that they are equal. For convenience of description, the current input values may be configured as follows: $I_1 = I_2 \ldots = I_M = 1$. When the wavelength of a transmitted wave (or signal) is $\lambda$ and the spacing between dipole antennas is $\Delta = \lambda/2$, the vertical beam width ($\theta_{BW}$) and the horizontal beam width ($\phi_{BW}$) of the beam pattern $|E(\theta, \phi)|^2$ formed in the horizontal direction can be calculated as follows.

To calculate the vertical beam width ($\theta_{BW}$), $\phi$ may be set to $$\frac{\pi}{2}.$$

If $$\phi = \frac{\pi}{2}$$

is substituted into the beam pattern $|E(\theta, \phi)|^2$, the beam pattern can be represented as shown in Equation 7.

$$\left|E\left(\theta, \frac{\pi}{2}\right)\right|^2 = \left|C \sum_{m=1}^{M} \sin\theta\right|^2 \quad \text{[Equation 7]}$$

In the case of the horizontal beamforming, if $$\theta = \frac{\pi}{2},$$

it indicates the boresight direction. Thus, to calculate the vertical beam width, it is necessary to find the points (i.e., −3 dB points) where the power density is reduced by half as compared to that in the case of $$\theta = \frac{\pi}{2}.$$

In other words, by finding the value of $\alpha$ that satisfies Equation 8, the vertical beam width can be represented as $2\alpha$.

$$\left|E\left(\frac{\pi}{2} + \alpha, \frac{\pi}{2}\right)\right|^2 = \frac{1}{2}\left|E\left(\frac{\pi}{2}, \frac{\pi}{2}\right)\right|^2 \quad \text{[Equation 8]}$$

When the horizontal beamforming is performed using the linear array antenna, the vertical beam width can be calculated as $$\theta_{BW} = \frac{\pi}{2}$$

because the equation of $$\alpha = \pm \frac{\pi}{4}$$

is satisfied according to Equation 8.

To calculate the horizontal beam width ($\phi_{BW}$), $\theta$ may be set to $$\frac{\pi}{2}.$$

If $$\theta = \frac{\pi}{2}$$

is substituted into the beam pattern $|E(\theta, \phi)|^2$, the beam pattern can be represented as shown in Equation 9.

$$\left|E\left(\frac{\pi}{2}, \phi\right)\right|^2 = \quad \text{[Equation 9]}$$

$$\left|C\sum_{m=1}^{M} e^{j\pi m \cos\phi}\right|^2 = |C|^2 \left|\frac{(e^{j\pi(M+1)\cos\phi} - e^{j\pi\cos\phi})}{e^{j\pi\cos\phi} - 1}\right|^2 =$$

$$|C|^2 \frac{2 - 2\cos(\pi M \cos\phi)}{2 - 2\cos(\pi \cos\phi)} = |C|^2 \left(\frac{\sin\left(\frac{M}{2}\pi\cos\phi\right)}{\sin\left(\frac{\pi}{2}\cos\phi\right)}\right)^2$$

In the case of the horizontal beamforming, if $$\phi = \frac{\pi}{2},$$

it indicates the boresight direction. Thus, to calculate the horizontal beam width, it is necessary to find the points (i.e., −3 dB points) where the power density is reduced by half as compared to that in the case of $$\phi = \frac{\pi}{2}.$$

In other words, by finding the value of α that satisfies Equation 10, the horizontal beam width can be represented as 2α.

$$\left|E\left(\frac{\pi}{2}, \frac{\pi}{2} + \alpha\right)\right|^2 = \frac{1}{2}\left|E\left(\frac{\pi}{2}, \frac{\pi}{2}\right)\right|^2 \quad \text{[Equation 10]}$$

Since the term on the left of Equation 10 can be calculated by Equation 9 and the term on the right of Equation 10 can be calculated by Equation 7, Equation 10 can be changed to Equation 11.

$$\left(\frac{\sin\left(\frac{M}{2}\pi\cos\left(\frac{\pi}{2} + \alpha\right)\right)}{\sin\left(\frac{\pi}{2}\cos\left(\frac{\pi}{2} + \alpha\right)\right)}\right)^2 = \frac{1}{2}M^2 \quad \text{[Equation 11]}$$

It is very difficult to find the value of α that satisfies Equation 11 for a random natural number M. However, when the following substitution is applied:

$$\frac{M\pi}{2}\cos\left(\frac{\pi}{2} + \alpha\right) = \frac{M\pi}{2}\sin\alpha = \beta$$

and it is assumed that M has a large value and α has a very small value, Equation 11 can be changed to Equation 12.

$$\left(\frac{\sin\left(\frac{M}{2}\pi\cos\left(\frac{\pi}{2} + \alpha\right)\right)}{\sin\left(\frac{\pi}{2}\cos\left(\frac{\pi}{2} + \alpha\right)\right)}\right)^2 = \quad \text{[Equation 12]}$$

$$\left(\frac{\sin\beta}{\sin\left(\frac{\pi}{2}\sin\alpha\right)}\right)^2 \approx \left(\frac{2}{\pi}\right)^2 \left(\frac{\sin\beta}{\sin\alpha}\right)^2 \approx \left(\frac{\sin\beta}{\beta}\right)^2 M^2$$

Equation 13 can be obtained from Equation 11 and Equation 12.

$$\left(\frac{\sin\beta}{\beta}\right)^2 = \frac{1}{2} \quad \text{[Equation 13]}$$

When β has the following value: β≈1.3916, Equation 13 can be satisfied. By substituting the corresponding β value into $$\frac{M\pi}{2}\cos\left(\frac{\pi}{2} + \alpha\right) = \frac{M\pi}{2}\sin\alpha = \beta,$$

α is approximated as follows:

$$\alpha \approx \pm\frac{0.8860}{M}.$$

Therefore, when the horizontal beamforming is performed by using the linear array antenna, the horizontal beam width can be obtained as follows:

$$\phi_{BW} \approx \frac{1.77}{M}.$$

In summary, when the horizontal beamforming is performed by using the linear array antenna composed of M dipole antennas, the vertical beam width ($\theta_{BW}$) of the beam pattern is given as follows:

$$\theta_{BW} = \frac{\pi}{2},$$

and the horizontal beam width ($\phi_{BW}$) of the beam pattern is given as follows:

$$\phi_{BW} = \Theta\left(\frac{1}{M}\right).$$

Here, $$\Theta\left(\frac{1}{M}\right)$$

means that as M increases, it decreases in proportion to the order of 1/M, and it can be represented by k/M (where K is a random constant).

Figure 4:
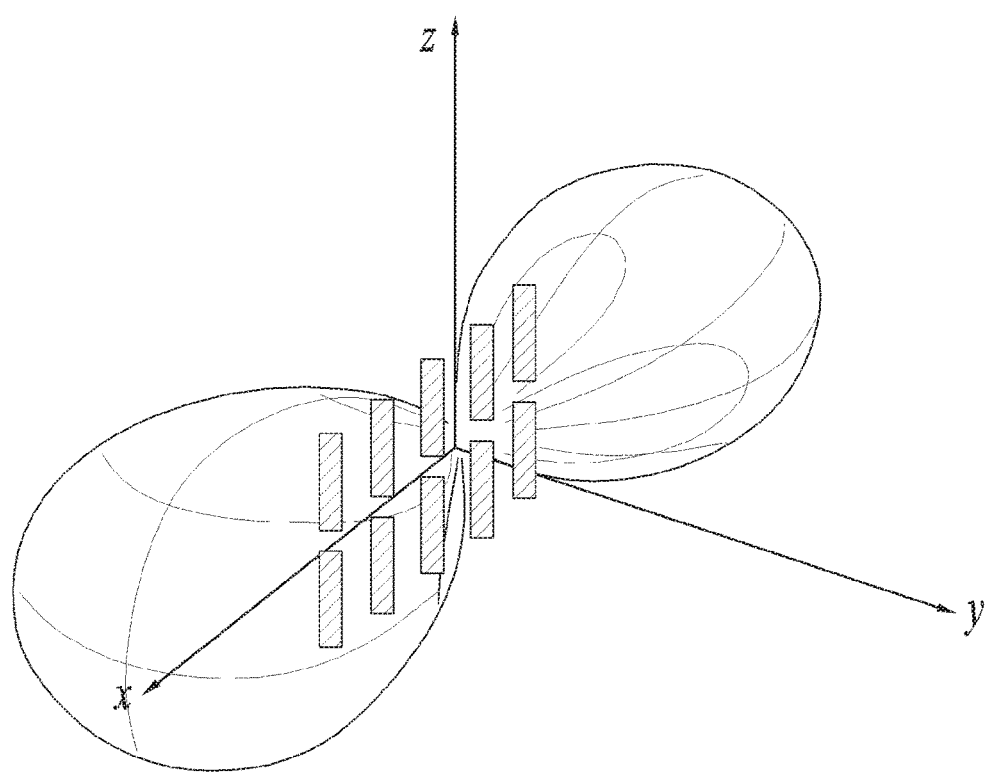
FIG. 4 illustrates a beam pattern when vertical beamforming is performed by using a linear array antenna.

FIG. 4 illustrates the beam pattern obtained when vertical beamforming is performed by using a linear array antenna. The vertical beamforming means that beamforming is applied in the same direction as that in which dipole antennas of the linear array antenna are arranged. For example, if the dipole antennas of the linear array antenna are arranged in the x-axis direction, the vertical beamforming may mean that the beamforming is applied in the x-axis direction. Although FIG. 4 shows five antennas for clarity, the invention is not limited thereto. The same/similar principle can be applied when there are M antennas.

FIG. 4 shows the beam pattern $|E(\theta, \phi)|^2$ that is formed in the vertical direction by using the linear array antenna composed of M antennas. When the vertical beamforming is performed, current inputs may be configured to have different phases such that the phases become equal to each other along the beamforming direction. Specifically, for the vertical beamforming, the input current to the mth antenna may be configured as follows: $I_m = e^{-jkm\Delta}$, 1≤m≤M. When the wavelength of a transmitted wave (or signal) is λ and the spacing between dipole antennas is Δ=λ/2, the vertical beam width ($\theta_{BW}$) and the horizontal beam width ($\phi_{BW}$) of the beam pattern $|E(\theta, \phi)|^2$ formed in the vertical direction can be calculated as follows.

To calculate the vertical beam width ($\theta_{BW}$), $\phi$ may be set to 0. If $\phi=0$ is substituted into the beam pattern $\sqrt[3]{E(\theta, \phi)|^2}$, the beam pattern can be represented as shown in Equation 14.

$$|E(\theta, 0)|^2 = \left|C\sum_{m=1}^{M} e^{jkm\Delta\sin\theta - jkm\Delta}\sin\theta\right|^2 = \qquad \text{[Equation 14]}$$

$$|C|^2 \left|\frac{(e^{j\pi(M+1)(\sin\theta-1)} - e^{j\pi(\sin\theta-1)})}{e^{j\pi(\sin\theta-1)} - 1}\right|^2 \sin^2\theta =$$

$$|C|^2 \frac{2 - 2\cos(\pi M(\sin\theta - 1))}{2 - 2\cos(\pi(\sin\theta - 1))}\sin^2\theta =$$

$$|C|^2 \left(\frac{\sin\left(\frac{M}{2}\pi(\sin\theta - 1)\right)}{\sin\left(\frac{\pi}{2}(\sin\theta - 1)\right)}\right)^2 \sin^2\theta$$

In the case of the vertical beamforming, if $$\theta = \frac{\pi}{2},$$

it indicates the boresight direction. Thus, to calculate the vertical beam width, it is necessary to find the points (i.e., −3 dB points) where the power density is reduced by half as compared to that in the case of $$\theta = \frac{\pi}{2}.$$

In other words, by finding the value of $\alpha$ that satisfies Equation 15, the vertical beam width can be represented as $2\alpha$.

$$\left|E\left(\frac{\pi}{2} + \alpha, 0\right)\right|^2 = \frac{1}{2}\left|E\left(\frac{\pi}{2}, 0\right)\right|^2 \qquad \text{[Equation 15]}$$

It is very difficult to find the value of $\alpha$ that satisfies Equation 15 for a random natural number M. However, when the following substitution is applied:

$$\frac{M}{2}\pi\left(\sin\left(\frac{\pi}{2} + \alpha\right) - 1\right) = \frac{M}{2}\pi(\cos\alpha - 1) = \beta$$

and it is assumed that M has a large value and $\alpha$ has a very small value, the term on the left of the Equation 15 can be changed to Equation 16.

$$|C|^2 \left(\frac{\sin\left(\frac{M}{2}\pi\left(\sin\left(\frac{\pi}{2} + \alpha\right) - 1\right)\right)}{\sin\left(\frac{\pi}{2}\left(\sin\left(\frac{\pi}{2} + \alpha\right) - 1\right)\right)}\right)^2 \sin^2\left(\frac{\pi}{2} + \alpha\right) \approx \qquad \text{[Equation 16]}$$

$$|C|^2 \left(\frac{\sin\beta}{\sin\left(\frac{\pi}{2}(\cos\alpha - 1)\right)}\right)^2 \approx$$

$$|C|^2 \left(\frac{\sin\beta}{\frac{\pi}{2}(\cos\alpha - 1)}\right)^2 \approx |C|^2 \left(\frac{\sin\beta}{\beta}\right)^2 M^2$$

Since the term on the right of Equation 15 can be calculated from the first or second term of Equation 14, Equation 15 can be changed to Equation 17.

$$\left(\frac{\sin\beta}{\beta}\right)^2 \approx \frac{1}{2} \qquad \text{[Equation 17]}$$

When $\beta$ has the following value: $\beta \approx 1.3916$, Equation 17 can be satisfied. By substituting the corresponding $\beta$ value into $$\frac{M}{2}\pi\left(\sin\left(\frac{\pi}{2} + \alpha\right) - 1\right) = \frac{M}{2}\pi(\cos\alpha - 1) = \beta$$

and using the approximation equation of $$\cos\alpha \approx 1 - \frac{\alpha^2}{2},$$

$\alpha$ is approximated as follows:

$$\alpha \approx \pm\sqrt{\frac{4\beta}{\pi M}} \approx \pm\frac{1.33}{\sqrt{M}}.$$

Therefore, when the vertical beamforming is performed by using the linear array antenna, the vertical beam width can be obtained as follows:

$$\theta_{BW} \approx \frac{2.66}{\sqrt{M}}.$$

To calculate the horizontal beam width ($\theta_{BW}$), $\theta$ may be set to $$\frac{\pi}{2}.$$

If $$\theta = \frac{\pi}{2}$$

is substituted into the beam pattern $|E(\theta, \phi)|^2$, the beam pattern can be represented as shown in Equation 18.

$$\left|E\left(\frac{\pi}{2}, \phi\right)\right|^2 = \left|C\sum_{m=1}^{M} e^{jkm\Delta\cos\phi - jkm\Delta}\right|^2 = \qquad \text{[Equation 18]}$$

-continued $$|C|^2 \left| \frac{(e^{j\pi(M+1)(\cos\phi-1)} - e^{j\pi(\cos\phi-1)})}{e^{j\pi(\cos\phi-1)} - 1} \right|^2 =$$

$$|C|^2 \frac{2 - 2\cos(\pi M(\cos\phi - 1))}{2 - 2\cos(\pi(\cos\phi - 1))} =$$

$$|C|^2 \left( \frac{\sin\left(\frac{M}{2}\pi(\cos\phi - 1)\right)}{\sin\left(\frac{\pi}{2}(\cos\phi - 1)\right)} \right)^2$$

In the case of the vertical beamforming, if $\phi=0$, it indicates the boresight direction. Thus, to calculate the horizontal beam width, it is necessary to find the points (i.e., −3 dB points) where the power density is reduced by half as compared to that in the case of $\phi=0$. In other words, by finding the value of $\alpha$ that satisfies Equation 19, the horizontal beam width can be represented as $2\alpha$.

$$\left| E\left(\frac{\pi}{2}, \alpha\right) \right|^2 = \frac{1}{2} \left| E\left(\frac{\pi}{2}, 0\right) \right|^2 \quad \text{[Equation 19]}$$

In Equation 19, if the following substitution is applied:

$$\frac{M}{2}\pi(\cos\alpha - 1) = \beta$$

and it is assumed that $\alpha$ has a very small value, the left term of Equation 19 may be deduced in the same way as Equation 16, and the right term of Equation 19 may be calculated by the first and second terms of Equation 18. Thus, similar to Equation 15, Equation 19 can be identical to Equation 17. That is, when $\beta$ has the following value: $\beta \approx 1.3916$, Equation 17 can be satisfied. By substituting the corresponding $\beta$ value into $$\frac{M}{2}\pi(\cos\alpha - 1) = \beta$$

and using the approximation equation of $$\cos\alpha \approx 1 - \frac{\alpha^2}{2},$$

$\alpha$ is approximated as follows:

$$\alpha \approx \pm\sqrt{\frac{4\beta}{\pi M}} \approx \pm\frac{1.33}{\sqrt{M}}.$$

Therefore, when the vertical beamforming is performed by using the linear array antenna, the horizontal beam width can be obtained as follows:

$$\phi_{BW} \approx \frac{2.66}{\sqrt{M}}.$$

In summary, when the vertical beamforming is performed by using the linear array antenna composed of M dipole antennas, the vertical beam width ($\theta_{BW}$) of the beam pattern is given as follows:

$$\theta_{BW} = \Theta\left(\frac{1}{\sqrt{M}}\right),$$

and the horizontal beam width ($\phi_{BW}$) of the beam pattern is given as follows:

$$\theta_{BW} = \Theta\left(\frac{1}{\sqrt{M}}\right).$$

Here, $$\Theta\left(\frac{1}{\sqrt{M}}\right)$$

means that as M increases, it decreases in proportion to the order of $1/\sqrt{M}$, and it can be represented by $k/\sqrt{M}$ (where K is a random constant).

Beam Pattern of Circular Array Antenna

Figure 5:
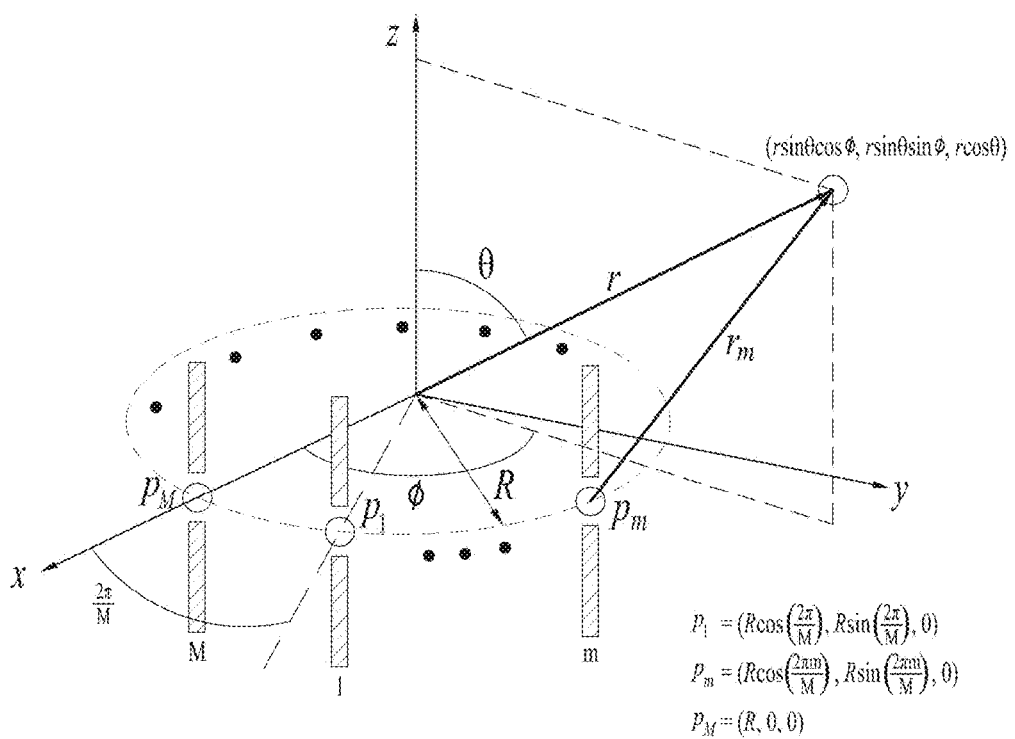
FIG. 5 illustrates a circular array antenna.

FIG. 5 illustrates a circular array antenna. In FIG. 5, it is assumed that the array antenna is composed of short-length lossless dipole antennas (for example, the length of the dipole antenna is much shorter than the wavelength of a transmitted wave (or signal)).

FIG. 5 shows the circular array antenna where M dipole antennas are uniformly arranged in the shape of a circle at the spacing of $\Delta$ on the x-y plane. In this case, the locations of the M dipole antennas can be represented using a three-dimensional coordinate system. For example, the locations of first, mth, and Mth antennas may be represented by $$p_1 = \left(R\cos\left(\frac{2\pi}{M}\right), R\sin\left(\frac{2\pi}{M}\right), 0\right),$$

$$p_m = \left(R\cos\left(\frac{2\pi m}{M}\right), R\sin\left(\frac{2\pi m}{M}\right), 0\right),$$

and $\rho_M=(R, 0, 0)$, respectively. That is, a random point in three-dimensional space can be represented by ($r \sin\theta \cos\phi$, $r \sin\theta \sin\phi$, $r \cos\phi$).

In the case of the circular array antenna, the equation that represents the electric field can be deduced in a similar way to that of the linear array antenna. The electric field formed by the circular array antenna can be deduced by Equation 20.

$$E(\theta, \phi) = C\sum_{m=1}^{M} I_m e^{jkR\sin\theta\cos(\phi-\phi_m)}\sin\theta \hat{\theta}, \quad \text{[Equation 20]}$$

$$\phi_m = \frac{2\pi m}{M}$$

Figure 6:
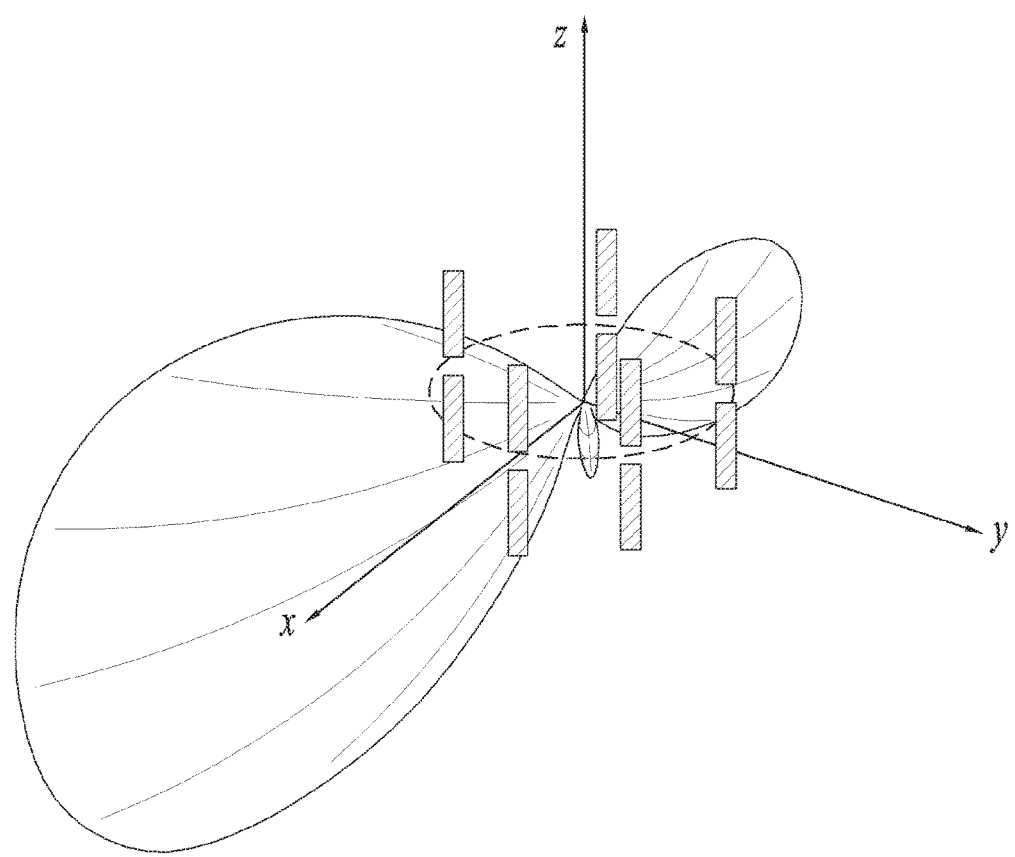
FIG. 6 illustrates a beam pattern when beamforming is performed by using a circular array antenna.

FIG. 6 illustrates the beam pattern obtained when beamforming is performed by using a circular array antenna. Although FIG. 6 shows five dipole antennas for convenience of description, the present invention is not limited thereto, and the same/similar principle can be applied when there are M antennas FIG. 6 shows the beam pattern $|E(\theta, \phi)|^2$ that is formed by the circular array antenna composed of M antennas. When beamforming is performed in the direction of $$(\theta, \phi) = \left(\frac{\pi}{2}, \phi_0\right)$$

on the x-y plane, current inputs may be configured to have different phases such that the phases become equal to each other along the beamforming direction. Specifically, to perform the beamforming in the direction of $$(\theta, \phi) = \left(\frac{\pi}{2}, \phi_0\right),$$

the input current to the mth antenna may be configured as follows: $I_m = e^{-jkR\,\cos(\phi_0 - \phi_m)}$, $1 \leq m \leq M$. When the wavelength of a transmitted wave (or signal) is $\lambda$ and the spacing between dipole antennas is $$\Delta = 2R\sin\left(\frac{\pi}{M}\right) = \lambda/2,$$

the vertical beam width ($\theta_{BW}$) and the horizontal beam width ($\phi_{BW}$) of the beam pattern $|E(\theta, \phi)|^2$ formed by the circular array antenna can be calculated as follows. In the following description, it is assumed that M has a very large value.

To calculate the vertical beam width ($\theta_{BW}$), $\phi = \phi_0$ can be substituted into Equation 20. By doing so, it is possible to obtain Equation 21 below.

$$|E(\theta, \phi_0)|^2 = \left| C \sum_{m=1}^{M} e^{jkR\sin\theta\cos(\phi_0 - \phi_m) - jkR\cos(\phi_0 - \phi_m)} \sin\theta \right|^2 \quad \text{[Equation 21]}$$

$$= |C|^2 \left| \sum_{m=1}^{M} e^{jkR(\sin\theta - 1)\cos(\phi_0 - \phi_m)} \right|^2 \sin^2\theta$$

The Jacobi-Anger expansion can be applied to Equation 21, and more specifically, Equation 22 may be used.

$$e^{jz\cos\theta} = \sum_{n=-\infty}^{\infty} j^n J_n(z) e^{jn\theta} \quad \text{[Equation 22]}$$

When $z = kR(\sin\theta - 1)$ and $\theta = \phi_0 - \phi_m$ are substituted into Equation 22, Equation 22 can be changed to Equation 23.

$$\sum_{m=1}^{M} e^{jkR(\sin\theta - 1)\cos(\phi_0 - \phi_m)} = \sum_{m=1}^{M} \sum_{n=-\infty}^{\infty} j^n J_n \quad \text{[Equation 23]}$$
$$(kR(\sin\theta - 1))$$
$$e^{jn(\phi_0 - \phi_m)}$$
$$= \sum_{n=-\infty}^{\infty} j^n J_n(kR(\sin\theta - 1))$$
$$e^{jn\phi_0} \sum_{m=1}^{M} e^{-jn\phi_m}$$

In Equation 23, $\Sigma_{m=1}^{M} e^{-jn\phi_m}$ can be expressed as shown in Equation 24.

$$\sum_{m=1}^{M} e^{-jn\phi_m} = \sum_{m=1}^{M} e^{-\frac{j2\pi n}{M}m} \quad \text{[Equation 24]}$$
$$= \begin{cases} 0 & \text{if } n \neq Mk \\ M & \text{if } n = Mk \end{cases}$$

where $K$ is an integer

By using Equation 24, Equation 23 can be changed to Equation 25.

$$\sum_{n=-\infty}^{\infty} j^n J_n(kR(\sin\theta - 1)) e^{jn\phi_0} \sum_{m=1}^{M} e^{-jn\phi_m} = \quad \text{[Equation 25]}$$

$$M \sum_{n=-\infty}^{\infty} j^{Mn} J_{Mn}(kR(\sin\theta - 1)) e^{jMn\phi_0}$$

The Bessel function satisfies Equations 26 to 28. Details of the Bessel function can be found in "G. N. Watson, A Treatise on the Theory of Bessel Functions, Cambridge University Press, 1995.", and the contents are incorporated by reference in the present specification.

$$|J_n(nz)| \leq \left| \frac{z^n e^{n\sqrt{1-z^2}}}{\left(1 + \sqrt{1-z^2}\right)^n} \right| \quad \text{[Equation 26]}$$

$$J_{-n}(x) = (-1)^n J_n(x) \quad \text{[Equation 27]}$$

$$J_0(nz) \approx \sqrt{\frac{2}{\pi nz}} \cos\left(nz - \frac{\pi}{4}\right) \quad \text{[Equation 28]}$$

According to Equation 26, the value of $J_n$ (nz) exponentially decreases with respect to the value of n. Equation 26 is valid when the order of n is negative. This is because Equation 27 is completed. According to Equation 28, $J_0$ (nz) decreases to $$\frac{1}{\sqrt{n}}.$$

Next, approximation is applied. When $\theta$ is less than or more than $\pi$, the following approximation can be established:

$$kR(\sin\theta - 1) < \frac{2\pi}{\lambda} \times \frac{\lambda}{4\sin\left(\frac{\pi}{M}\right)} \times 2 \approx M.$$

In other words, for all integer n (where $n \neq 0$), the value (or argument) of kR (sin $\theta$ – 1) of the Bessel function of $J_{Mn}$ (kR(sin $\theta$ – 1)) is less than the value (or order) of Mn. In this case, it is possible to consider only the case of n=0 without summation from n=–∞ to n=∞.

Based on this fact, the beam pattern of Equation 21 can be approximated by Equation 29.

$$|E(\theta, \phi_0)|^2 = |C|^2 \left| \sum_{m=1}^{M} e^{jkR(\sin\theta-1)\cos(\phi_0-\phi_m)} \right|^2 \sin^2\theta$$

$$= |C|^2 \left| M \sum_{n=-\infty}^{\infty} j^{Mn} J_{Mn}(kR(\sin\theta-1))e^{jMn\phi_0} \right|^2 \sin^2\theta$$

$$= |C|^2 \left| M \sum_{n=-\infty}^{\infty} j^{Mn} J_{Mn}(kR(\sin\theta-1))e^{jMn\phi_0} \right|^2 \sin^2\theta$$

$$\approx |C|^2 |MJ_0(kR(\sin\theta-1))|^2 \sin^2\theta$$

[Equation 29]

Since it is assumed that beams are formed on the x-y plane, it is necessary to find the points (i.e., −3 dB points) where the power density is reduced by half as compared to that in the case of $$\theta = \frac{\pi}{2}$$

in order to calculate the vertical beam width. In other words, by finding the value of α that satisfies Equation 30, the vertical beam width can be represented as 2α.

$$\left|E\left(\frac{\pi}{2}+\alpha, \phi_0\right)\right|^2 = \frac{1}{2}\left|E\left(\frac{\pi}{2}, \phi_0\right)\right|^2$$

[Equation 30]

By applying the approximation of Equation 29 to the left side of Equation 30 and substituting the first term of Equation 29 into the right side of Equation 30, Equation 30 can be changed to Equation 31.

$$|J_o(kR(\cos\alpha-1))|^2 \cos^2\alpha \approx \tfrac{1}{2}$$

[Equation 31]

If it is assumed that M has a large value and α has a very small value in Equation 31, it is possible to obtain the approximation shown in Equation 32 by using $$\Delta = 2R\sin\left(\frac{\pi}{M}\right) = \lambda/2.$$

$$kR = \frac{2\pi}{\lambda} \times \frac{\lambda}{4\sin\left(\frac{\pi}{M}\right)} \approx \frac{M}{2}$$

$$\cos\alpha - 1 \approx -\frac{\alpha^2}{2}$$

$$\cos\alpha \approx 1$$

[Equation 32]

By using the approximation of Equation 32, Equation 31 can be changed to Equation 33.

$$\left|J_0\left(\frac{M}{4}\alpha^2\right)\right|^2 \approx \frac{1}{2}$$

[Equation 33]

The result of $$\frac{M}{4}\alpha^2 \approx 1.126$$

can be obtained from Equation 33, and the vertical beam width of $$\theta_{BW} \approx \frac{21.2}{\sqrt{M}}$$

can be obtained from the corresponding result.

Since it is assumed that the beamforming is performed on the x-y plane, θ may be set to $$\frac{\pi}{2}$$

to calculate the horizontal beam width ($\phi_{BW}$). Similar to the vertical beam width, it is assumed that M has a very large value. When $$\theta = \frac{\pi}{2}$$

is substituted, the beam pattern $|E(\theta, \phi)|^2$ can be represented as shown in Equation 34.

$$|E(\theta,\phi)|^2 = \left|C\sum_{m=1}^{M} e^{jkR\cos(\phi-\phi_m)-jkR\cos(\phi_0-\phi_m)}\right|^2$$

$$= |C|^2 \left|\sum_{m=1}^{M} e^{-2jkR\sin\left(\frac{\phi-\phi_0}{2}\right)\sin\left(\frac{\phi+\phi_0}{2}-\phi_m\right)}\right|^2 \sin^2\theta$$

[Equation 34]

The Jacobi-Anger expansion can be applied to Equation 34, and more specifically, Equation 35 may be used.

$$e^{jz\sin\theta} = \sum_{n=-\infty}^{\infty} J_n(z)e^{jn\theta}$$

[Equation 35]

By using Equation 35, Equation 36 can be obtained.

$$\sum_{m=1}^{M} e^{-2jkR\sin\left(\frac{\phi-\phi_0}{2}\right)\sin\left(\frac{\phi+\phi_0}{2}-\phi_m\right)} = M\sum_{n=-\infty}^{\infty} J_{Mn}\left(-2kR\sin\left(\frac{\phi-\phi_0}{2}\right)\right)e^{jMn\left(\frac{\phi+\phi_0}{2}\right)}$$

$$\approx MJ_0\left(-2kR\sin\left(\frac{\phi-\phi_0}{2}\right)\right)$$

[Equation 36]

When beams are formed in the direction of $\phi=\phi_0$ on the x-y plane, it is necessary to find the points (i.e., −3 dB points) where the power density is reduced by half as compared to that in the case of $\phi=\phi_0$. In other words, by finding the value of $\alpha$ that satisfies Equation 37, the horizontal beam width can be represented as $2\alpha$.

$$\left|E\left(\frac{\pi}{2},\phi_0+\alpha\right)\right|^2 = \frac{1}{2}\left|E\left(\frac{\pi}{2},\phi_0\right)\right|^2 \quad \text{[Equation 37]}$$

By applying the approximation of Equation 36 to the left side of Equation 37 and substituting Equation 34 into the right side of Equation 37, Equation 37 can be changed to Equation 38.

$$J_0^2\left(-2kR\sin\left(\frac{\alpha}{2}\right)\right) \approx \frac{1}{2} \quad \text{[Equation 38]}$$

By using $$\Delta = 2R\sin\left(\frac{\pi}{M}\right) = \lambda/2$$

and assuming that M has a large value and $\alpha$ has a very small value, the approximation shown in Equation 39 can be achieved.

$$kR = \frac{2\pi}{\lambda} \times \frac{\lambda}{4\sin\left(\frac{\pi}{M}\right)} \approx \frac{M}{2} \quad \text{[Equation 39]}$$

$$\sin\left(\frac{\alpha}{2}\right) \approx \frac{\alpha}{2}$$

By using the approximation of Equation 39, Equation 38 can be changed to Equation 40.

$$J_0^2\left(\frac{M\alpha}{2}\right) \approx \frac{1}{2} \quad \text{[Equation 40]}$$

The result of $$\frac{M\alpha}{2} \approx 1.126$$

can be obtained from Equation 40, and the horizontal beam width of $$\phi_{BW} \approx \frac{4.5}{M}$$

can be obtained from the corresponding result.

In summary, when the beamforming is performed by using the circular array antenna composed of M dipole antennas, the vertical beam width ($\theta_{BW}$) of the beam pattern is given as follows:

$$\theta_{BW} = \Theta\left(\frac{1}{\sqrt{M}}\right),$$

and the horizontal beam width ($\phi_{BW}$) of the beam pattern is given as follows:

$$\phi_{BW} = \Theta\left(\frac{1}{M}\right).$$

Here, $$\Theta\left(\frac{1}{\sqrt{M}}\right)$$

means that as M increases, it decreases in proportion to the order of $1/\sqrt{M}$, and it can be represented by $k/\sqrt{M}$ (where K is a random constant). In addition, $$\Theta\left(\frac{1}{M}\right)$$

means that as M increases, it decreases in proportion to the order of $1/M$, and it can be represented by $k/M$ (where K is a random constant).

Meanwhile, it is already known that each dipole antenna of an array antenna (e.g., linear or circular array antenna) has the directivity of 3/2. Considering that the directivity of the array antenna composed of M dipole antennas increases by m times, the directivity of the array antenna can be represented as $3/2^M$.

When the spacing between antennas is set to half of the wavelength of a transmitted wave (or signal) (i.e., $\Delta=\lambda/2$), the vertical and horizontal beam patterns of the linear array antenna and the beam pattern of the circular array antenna can be summarized with respect to the directivity, vertical beam width, and horizontal beam width as shown in Table 1. In Table 1, M indicates the number of antennas.

TABLE 1

| | Linear arrangement ($\Delta = \lambda/2$) Horizontal direction | Linear arrangement ($\Delta = \lambda/2$) Vertical direction | Circular arrangement ($\Delta = \lambda/2$) Plane direction |
|---|---|---|---|
| Directivity | $\frac{3}{2}M$ | $\frac{3}{2}M$ | $\frac{3}{2}M$ |
| $\theta_{BW}$ (rad) | $\frac{\pi}{2}$ | $\Theta\left(\frac{1}{\sqrt{M}}\right)$ | $\Theta\left(\frac{1}{\sqrt{M}}\right)$ |
| $\phi_{BW}$ (rad) | $\Theta\left(\frac{1}{M}\right)$ | $\Theta\left(\frac{1}{\sqrt{M}}\right)$ | $\Theta\left(\frac{1}{M}\right)$ |

Referring to Table 1, in the case of the linear arrangement, the magnitude of the vertical beam width varies according to whether the beamforming is performed in either the vertical or horizontal direction. In other words, it can be seen that in the linear arrangement, the magnitude of the vertical beam width depends on the beamforming direction. On the contrary, in the case of the circular arrangement, the magnitude of the vertical beam width decreases in proportion to the reciprocal ($1/\sqrt{M}$) of the square root of the number of antennas (M). In other words, it can be seen that the same beam patterns are formed regardless of the beamforming direction.

Since the circular arrangement has a symmetric structure, it is advantageous in that the same beam patterns are obtained regardless of the beamforming direction, but the circular arrangement requires a large area compared to the linear arrangement. Therefore, the structure where the spacing between antennas is less than half of the wavelength of a transmitted wave (or signal) while the circular arrangement is maintained can be considered. For example, the radius of the circular array antenna may be adjusted such that the antenna spacing is less than half of the wavelength.

However, when the antenna spacing is less than half of the wavelength, mutual coupling may occur between antennas. Since when the mutual antenna coupling occurs, the side lobe level of a radiation pattern may increase, the directivity may decrease even though the actual radiation power increases. That is, when the mutual antenna coupling occurs, the maximum directivity cannot be achieved even though antenna input values are set to be equal to each other and phases are controlled. To solve this problem, a method for controlling the mutual antenna coupling by installing a decoupling precoder in the antenna array may be considered.

Hereinafter, the beam pattern when coupling is considered and the beam pattern when it is not considered are described on the assumption that an antenna spacing is less than half of the wavelength of a transmitted wave (or signal). The case where the coupling is considered may mean that decoupling precoders are applied, and the case where the coupling is considered may mean that no decoupling precoder is applied.

In addition, in the circular array antenna, as the radius decreases or the number of antennas increases, the spacing between antennas may decrease or the coupling may increase. On the contrary, as the radius increases or the number of antennas decreases, the spacing between antennas may increase or the coupling may decrease. Thus, fixing the radius of the circular array antenna includes a case where the antenna spacing is fixed due to a fixed number of antennas of the circular array antenna.

Moreover, if the circular array antenna has a sufficiently small radius, the spacing between operating antennas of the circular array antenna may vary. For example, the spacing between the operating antennas may vary by activating/deactivating a specific number of antennas of the circular array antenna. More specifically, considering that the spacing between the operating antennas decreases as the number of activated antennas increases (or the number of deactivated antennas decreases), this may correspond to the case where the radius of the circular array antenna decreases. As another example, considering that the spacing between the operating antennas increases as the number of deactivated antennas increases (or the number of activated antennas increases), this may correspond to the case where the radius of the circular array antenna increases.

A Case in which the Coupling is not Considered without Fixing the Radius of the Circular Array Antenna When the radius of the circular array antenna is fixed, it can be assumed that the radius is sufficiently large. In this case, the vertical beam width can be calculated based on Equations 31 and 32. Assuming that there are a sufficiently large number of antennas, the number of antennas is M, and the radius of the array antenna is R, Equation 31 can be changed to Equation 41. As described above, k is the angular frequency set to $$\frac{2\pi}{\lambda}.$$

$$\left| J_0\left(\frac{\pi R}{\lambda}\alpha^2\right) \right|^2 \approx \frac{1}{2} \qquad \text{[Equation 41]}$$

Therefore, assuming that R is sufficiently large, the vertical beam width can be represented as $$\theta_{BW} = \Theta\left(\frac{1}{\sqrt{R}}\right),$$

similar to the result of Equation 33.

Similarly, the horizontal beam width can be calculated based on Equations 38 and 39. Assuming that there are a sufficiently large number of antennas, the number of antennas is M, and the radius of the array antenna is R, Equation 38 can be changed to Equation 42.

$$J_0^2\left(\frac{2\pi}{\lambda}R\sin\left(\frac{\alpha}{2}\right)\right) = \frac{1}{2} \qquad \text{[Equation 42]}$$

By applying Equation 39 to Equation 42 and assuming that R is sufficiently large, the horizontal beam width can be represented as $$\phi_{BW} = \Theta\left(\frac{1}{R}\right),$$

similar to the result of Equation 40.

A Case in which the Radius of the Circular Array Antenna is Sufficiently Small and the Coupling is not Considered When the radius of the circular array antenna is sufficiently small, that is, when the radius has an infinite value close to zero, a phase difference between antennas also becomes close to zero. Thus, when the radius of the circular array antenna is sufficiently small, it is possible to consider that multiple dipole antennas radiate the same current at a single point. Consequently, the radiation pattern of the multiple dipole antenna becomes equal to that of a single dipole antenna. Since the vertical beam width of the single dipole antenna is $\pi/2$, $\theta_{BW}$ is $$\frac{\pi}{2}.$$

In addition, the horizontal beam width of the single dipole antenna is $2\pi$, $\theta_{BW}$ is $2\pi$.

A Case in which the Radius of the Circular Array Antenna is Sufficiently Small and the Coupling is Considered When the radius of the circular array antenna is R, the electric filed can be deduced as shown in Equation 20. By applying the Jacobi-Anger expansion to Equation 20, it is possible to obtain Equation 43.

$$C \sum_{m=1}^{M} I_m e^{jkR\sin\theta \cos(\phi-\phi_m)} \sin\theta = \qquad \text{[Equation 43]}$$

$$C \sum_{m=1}^{M} I_m \sum_{n=-\infty}^{\infty} j^n J_n(kR\sin\theta) e^{jn(\phi-\phi_m)} \sin\theta =$$

$$C \sum_{n=-\infty}^{\infty} j^n J_n(kR\sin\theta) e^{jn\phi} \sin\theta \sum_{m=1}^{M} I_m e^{-jn\phi_m}$$

In Equation 43, by substituting $u_n = \sum_{m=1}^{M} I_m e^{-jn\phi_m}$, it is possible to obtain $u_n = u_{n+kM}$. Thus, Equation 43 can be changed to Equation 44.

$$C \sum_{n=-\infty}^{\infty} j^n J_n(kR\sin\theta) e^{jn\phi} \sin\theta \sum_{m=1}^{M} I_m e^{-jn\phi_m} = \qquad \text{[Equation 44]}$$

$$C \sum_{n=-\infty}^{\infty} j^n J_n(kR\sin\theta) e^{jn\phi} \sin\theta u_n =$$

$$C \sum_{m=1}^{M} u_m \sum_{n=-\infty}^{\infty} j^{nM+m} J_{nM+m}(kR\sin\theta) e^{j(nM+m)\phi} \sin\theta$$

By using Equation 44, the radiation power can be calculated as shown in Equation 45.

$$P = \int_0^{2\pi} \int_0^{\pi} |E(\theta,\phi)|^2 \sin\theta \, d\theta d\phi = \qquad \text{[Equation 45]}$$

$$2\pi |C|^2 \sum_{m=1}^{M} |u_m|^2 \int_0^{\pi} \sum_{n=-\infty}^{\infty} J_{nM+m}^2(kR\sin\theta) \sin^3\theta \, d\theta$$

If there is limitation on the radiation power, $u_m$, which can provide the maximum directivity in the direction of $(\theta,\phi)=(\theta_0,\phi_0)$, can be determined according to Equation 46.

$$u_m = \frac{\sum_{n=-\infty}^{\infty} (-j)^{nM+m} J_{nM+m}(kR\sin\theta_0) e^{-j(nM+m)\phi_0} \sin\theta_0}{\int_0^{\pi} \sum_{s=-\infty}^{\infty} J_{nM+m}^2(kR\sin\theta) \sin^3\theta \, d\theta} \qquad \text{[Equation 46]}$$

If the value of m is in the range of $1 \leq m \leq M$ and the beamforming is performed in a plane direction, $$\theta_0 = \frac{\pi}{2}$$

can be substituted into Equation 46.

Based on Equation 46, the vertical beam width ($\theta_{BW}$) can be calculated as follows. Assuming that $\phi = \phi_0$, the beam pattern can be represented as shown in Equation 47.

$$|E(\theta,\phi_0)|^2 = \qquad \text{[Equation 47]}$$

$$\left| C \sum_{m=1}^{M} \frac{\sum_{n=-\infty}^{\infty} (-j)^{nM+m} J_{nM+m}(kR\sin\theta) e^{-j(nM+m)\phi_0} \sin\theta}{\int_0^{\pi} \sum_{s=-\infty}^{\infty} J_{nM+m}^2(kR\sin\theta) \sin^3\theta \, d\theta} \right.$$

$$\left. \sum_{n=-\infty}^{\infty} j^{nM+m} J_{nM+m}(kR) e^{j(nM+m)\phi_0} \right|^2$$

Next, the approximation shown in Equation 48 is applied.

$$J_\alpha(x) \approx \frac{1}{\Gamma(\alpha+1)} \left(\frac{x}{2}\right)^\alpha \qquad \text{[Equation 48]}$$

Equation 48 is satisfied when x has a sufficiently small value (that is, when the value of x is close to zero). Thus, by applying the limit operation to Equation 47, $\lim_{R\to 0}|E(\theta,\phi_0)|^2$ can be represented as shown in Equation 49.

$$\lim_{R\to\infty} |E(\theta,\phi_0)|^2 = |C|^2 \qquad \text{[Equation 49]}$$

$$\left| \sum_{m=1}^{[M/2]} \left\{ \frac{2}{\sqrt{\pi}} \frac{\Gamma\left(m+\frac{5}{2}\right)}{\Gamma\left(m+\frac{5}{2}\right)} \sin^{n+1}\theta + \frac{3}{4}\sin\theta \right\} \right|^2$$

Since it is assumed that the beamforming is performed on the x-y plane, it is necessary to find the points (i.e., −3 dB points) where the power density is reduced by half as compared to that in the case of $$\theta = \frac{\pi}{2}$$

in order to calculate the vertical beam width. In other words, by finding the value of a that satisfies Equation 50, the vertical beam width can be represented as $2\alpha$.

$$\left|E\left(\frac{\pi}{2}+\alpha,\phi_0\right)\right|^2 = \frac{1}{2}\left|E\left(\frac{\pi}{2},\phi_0\right)\right|^2 \qquad \text{[Equation 50]}$$

The result of $$\alpha \approx \frac{1.55}{M}$$

can be obtained by applying the approximation to Equation 50. Finally, the vertical beam width of $$\theta_{BW} \approx \frac{3.1}{M}$$

can be obtained.

Assuming that the beamforming is performed on the x-y plane, the beam pattern can be calculated by substituting $$\theta = \frac{\pi}{2}$$

in order to calculate the horizontal beam width ($\phi_{BW}$). When $$\theta = \frac{\pi}{2}$$

is substituted, the beam pattern $|E(\theta, \phi)|^2$ can be represented as shown in Equation 51.

$$|E(\frac{\pi}{2}, \phi)|^2 = \left| C \sum_{m=1}^{M} \frac{\sum_{n=-\infty}^{\infty}(-j)^{nM+m} J_{nM+m}(kR) e^{-j(nM+m)\phi_0}}{\int_0^{\pi} \sum_{s=-\infty}^{\infty} J_{nM+m}^2(kR\sin\theta) \sin^3\theta \, d\theta} \sum_{n=-\infty}^{\infty} j^{nM+m} J_{nM+m}(kR) e^{j(nM+m)\phi} \right|^2 \quad \text{[Equation 51]}$$

By applying the Bessel function of Equation 48, $$\lim_{R \to 0} |E(\frac{\pi}{2}, \phi)|^2$$

can be represented as shown in Equation 52.

$$\lim_{R \to \infty} |E(\frac{\pi}{2}, \phi)|^2 = |C|^2 \left| \sum_{m=1}^{[M/2]} \left\{ \frac{2}{\sqrt{\pi}} \frac{\Gamma(m+\frac{5}{2})}{\Gamma(m+\frac{5}{2})} \cos m(\phi - \phi_0) + \frac{3}{4} \right\} \right|^2 \quad \text{[Equation 52]}$$

When beams are formed in the direction of $\phi=\phi_0$ on the x-y plane, it is necessary to find the points (i.e., −3 dB points) where the power density is reduced by half as compared to that in the case of $\phi=\phi_0$. In other words, by finding the value of $\alpha$ that satisfies Equation 53, the horizontal beam width can be represented as $2\alpha$.

$$|E(\frac{\pi}{2}, \phi_0 + \alpha)|^2 = \frac{1}{2} |E(\frac{\pi}{2}, \phi_0)|^2 \quad \text{[Equation 53]}$$

By applying several approximations to Equation 53, the result of $$\alpha \approx \frac{2.4}{M}$$

can be obtained, and thus the horizontal beam width of $$\phi_{BW} \approx \frac{4.8}{M}$$

can also be obtained.

In summary, when the radius of the circular array antenna is sufficiently small and the coupling is considered, the vertical beam width ($\theta_{BW}$) of the beam pattern is given as $$\theta_{BW} = \Theta\left(\frac{1}{\sqrt{M}}\right),$$

and the horizontal beam width ($\phi_{BW}$) of the beam pattern is given as $$\phi_{BW} = \Theta\left(\frac{1}{M}\right).$$

Here, $$\Theta\left(\frac{1}{\sqrt{M}}\right)$$

means that as M increases, it decreases in proportion to the order of $1/\sqrt{M}$, and it can be represented by $k/\sqrt{M}$ (where K is a random constant). In addition, $$\Theta\left(\frac{1}{M}\right)$$

means that as M increases, it decreases in proportion to the order of 1/M, and it can be represented by k/M (where K is a random constant).

As described above, when the antenna spacing is less than half of the wavelength of a transmitted wave (or signal), the vertical and horizontal beam widths can be summarized as shown in Table 2 with respect to the following cases: when the radius of the circular array antenna is fixed; when the radius of the circular array antenna is extremely small; when the coupling is considered: and when no coupling is considered. In Table 2, R→0 means that the radius of the circular array antenna is (sufficiently) small and/or that the spacing between the operating antennas of the circular array antenna varies. In addition, M indicates the number of antennas.

TABLE 2

| | Circular arrangement (R is fixed) Coupling is not considered | Circular arrangement (R → 0) Coupling is not considered | Circular arrangement (R → 0) Coupling is considered |
|---|---|---|---|
| $\theta_{BW}$ (rad) | $\Theta\left(\frac{1}{\sqrt{R}}\right)$ | $\frac{\pi}{2}$ | $\Theta\left(\frac{1}{\sqrt{M}}\right)$ |
| $\phi_{BW}$ (rad) | $\Theta\left(\frac{1}{R}\right)$ | $2\pi$ | $\Theta\left(\frac{1}{M}\right)$ |

Referring to Table 2, when input values are inputted to antennas with different phase differences without consideration of the antenna coupling, the beam width is not affected by the number of antennas. In this case, although the number of antennas increases, it does not affect the beam width. Instead, it can be seen that the beam width is affected by the magnitude of the radius. On the other hand, when input values are inputted to antennas by considering the coupling, it can be seen that even though the radius is very small, the beam width decreases as the number of antennas increases. That is, when the input values are inputted to the antennas by considering the coupling, it is possible to obtain the same result as that of Table 1, where there is no coupling. Thus, it can be seen that when the circular array antenna has a finite radius, if the coupling is considered, the beam width can be controlled by using the number of antennas. More specifically, it can be seen that when the circular array antenna has a finite radius, if the coupling is considered, it is possible to decrease the beam width by increasing the number of antennas. Therefore, when precoders are used to control mutual antenna coupling, efficient beamforming can be achieved.

Figure 7:
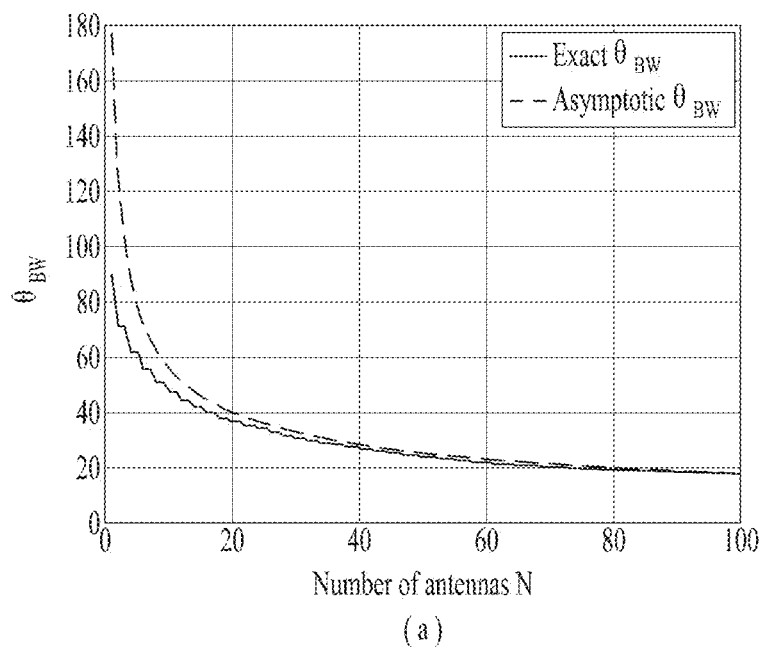
FIG. 7 illustrates vertical and horizontal beam widths in accordance with the number of antennas.
Figure 7:
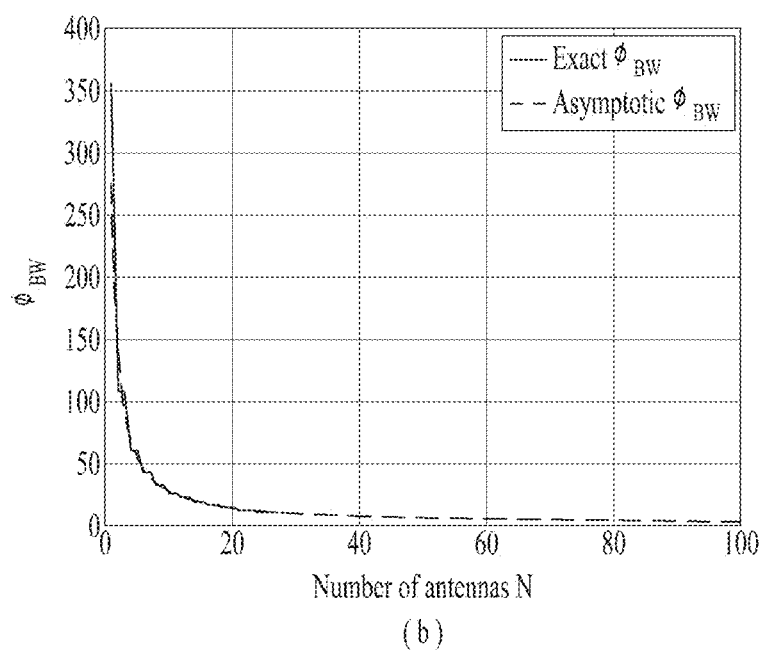

FIG. 7 illustrates vertical and horizontal beam widths that depend on the number of antennas. Specifically, FIG. 7(a) shows the comparison of actual vertical beam widths and approximately calculated beam widths that depend on the number of antennas, and FIG. 7 (b) shows the comparison of actual horizontal beam widths and approximately calculated beam widths that depend on the number of antennas.

Referring to FIG. 7(a), it can be seen that as the number of antennas increases, the approximated beam width is closer to the actual beam width, and as the number M of antennas increases, the actual and approximated beam widths are reduced to $1/\sqrt{M}$. Referring to FIG. 7(b), it can be seen that as the number of antennas increases, the approximated beam width is closer to the actual beam width, and as the number M of antennas increases, the actual and approximated beam widths are reduced to $1/\sqrt{M}$. Therefore, it can also be seen that the results of Tables 1 and 2 are accurate.

When a receiver moves in a wireless communication system, the value of an elevation angle may vary. If a transmitter transmits a signal to the receiver through beamforming, the transmitter should be able to control the beam width by considering the location of the receiver. For example, the transmitter may adjust the beam width such that the receiver covers 3 dB vertical beam width and 3 dB horizontal beam width. However, as described above, in the case of the linear array antenna, the beam width varies according to the beam direction, whereas in the case of the circular array antenna, the beam width can be controlled according to the number of antennas regardless of the beam direction. However, considering that the circular array antenna is somewhat inefficient in terms of space arrangement, it is possible to reduce the radius of the circular array antenna, but in this case, coupling between antennas may occur. When the antenna coupling occurs, the beam width cannot be reduced less than a certain threshold. However, this coupling problem can be solved by using decoupling precoders.

The present invention proposes a method for performing beamforming by using a circular array antenna with a fixed radius, which is composed of a predetermined number of antennas. More specifically, the present invention proposes a method for adjusting vertical beam width and/or horizontal beam width when the radius of the circular array antenna including the predetermined number of antennas is fixed.

Figure 8:
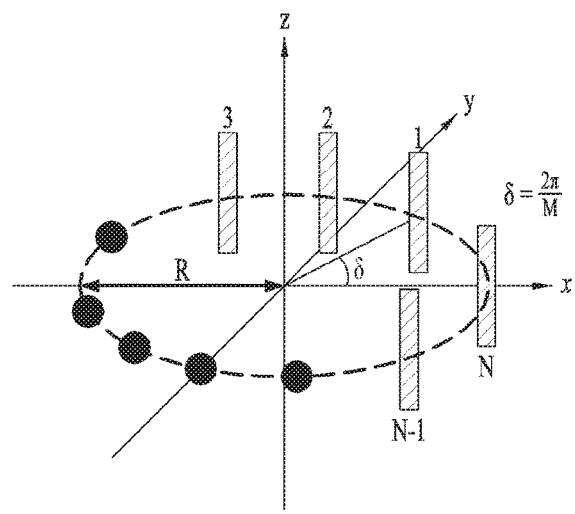
FIG. 8 illustrates a circular array antenna to which the present invention is applicable.

FIG. 8 illustrates a circular array antenna to which the present invention is applicable.

Referring to FIG. 8, the circular array antenna may be constructed by arranging N antennas on the x-y plane in the orthogonal coordinate system. In this case, the N antennas are arranged in a circular symmetric manner, and the circular symmetry means that the antennas have the same central angle. In FIG. 8, when the N antennas are arranged in a circular symmetric manner, the central angle δ has the same value of $2\pi/N$. The radius of the circular array antenna can be denoted by R, which may be fixed to a certain value. In addition, N indicates the total number of antennas included in the circular array antenna.

According to the present invention, the beam width is adjusted by using the circular array antenna such that the number of operating antennas among entire antennas is determined according to desired beam width, instead of physically changing the circular array antenna, for example, adjusting the magnitude of the radius or eliminating/adding antennas. The number of operating antennas among the entire antennas is denoted by $N_{active}$. That is, $N_{active}$ indicates the number of activated or operating antennas among the entire antennas. The antenna used for beamforming among the entire antennas included in the array antenna could be referred to as the operation or activated antenna. Since the number of operating antennas used for beamforming is $N_{active}$, $N_{active}$ may correspond to the number M of antennas mentioned in the foregoing description.

According to the present invention, since the radius of the circular array antenna is fixed but the number of operating antenna can vary depending on the desired beam width, it may correspond to the case of R→0 in Table 2. Thus, if the spacing between operating antennas is equal to or more than half of the wavelength of a transmitted signal (or wave), the number of operating antennas may be determined according to the beam width based on the principles described in Table 1. On the other hand, if the spacing between operating antennas is less than half of the wavelength of a transmitted signal (or wave), the number of operating antennas may be determined according to the beam width based on the principles described in Table 2.

The number of operating antennas ($N_{active}$) can be determined to be one of the divisors of the total number of antennas (N). For example, in the case of N=9, N has divisors of 1, 3, and 9, and thus $N_{active}$ can be determined as one of 1, 3, and 9. As another example, in the case of N=8, N has divisors of 1, 2, 4, and 8, and thus $N_{active}$ can be determined as one of 1, 2, 4, and 8. The transmitter may first determine the desired beam width and then determine the value of $N_{active}$ by selecting the divisor corresponding to the determined beam width.

As described above with reference to Tables 1 and 2, the relationship between the vertical beam width and the number of antennas can be represented by $$\theta_{BW} = \Theta\left(\frac{1}{\sqrt{M}}\right),$$

and the relationship between the horizontal beam width and the number of antennas can be represented by $$\phi_{BW} = \Theta\left(\frac{1}{M}\right).$$

Thus, when the desired vertical beam width is determined, the number of operating antennas ($N_{active}$) may be determined by $$\theta_{BW} = \frac{K1}{\sqrt{N_{active}}}$$

(where K1 is a constant). Alternatively, when the desired horizontal beam width is determined, the number of operating antennas ($N_{active}$) may be determined by $$\phi_{BW} = \frac{K2}{N_{active}}$$

(where K2 is a constant).

When the number of operating antennas ($N_{active}$) is determined, among all N antennas, $N_{active}$ antennas may be randomly activated. That is, the number of structures available for the circular array antenna composed of $N_{active}$ antennas may be $$\binom{N}{N_{active}},$$

and among them, a random structure may be selected and used. Here, $$\binom{n}{r}$$

indicates $$\frac{n!}{(n-r)!n!}.$$

Preferably, to minimize coupling between antennas, $N_{active}$ antennas that are arranged in a circular symmetric manner may be selected from among all N antennas. More specifically, when the N antennas are arranged in a circular symmetric manner, if $N_{active}$ is one divisor of N, the $N_{active}$ antennas are also arranged in a circular symmetric manner. In this case, the coupling between the operating antennas can be minimized.

Figure 9:
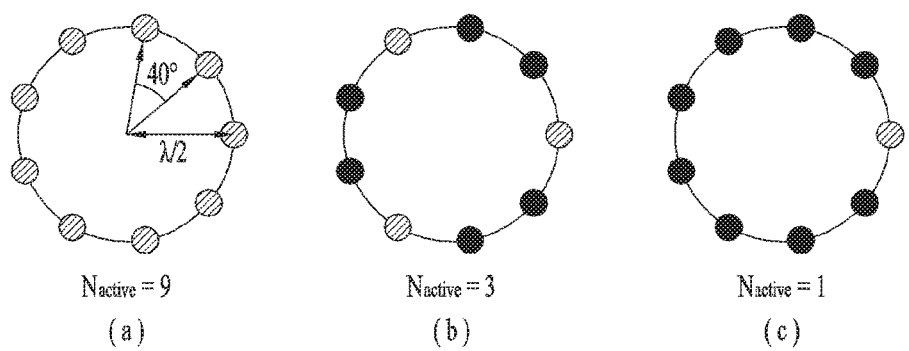
FIG. 9 illustrates antenna structures according to the present invention.

FIG. 9 illustrates the antenna structures according to the present invention.

Referring to FIG. 9, the radius of a circular array antenna is set to half of the wavelength and the circular array antenna may have a total of nine antennas. In FIG. 9, the gray circle corresponds to an activated or operating antenna, and the back circle corresponds to a deactivated or non-operating antenna. All the nine antennas can be arranged in a circular symmetric manner, and in this case, the central angle between the antennas may be set to 40 degrees.

According to the present invention, the number of activated or operating antennas ($N_{active}$) may be determined as one of the divisors of 9. FIG. 9(a) shows that when $N_{active}$ is set to 9, all nine antennas are activated or operating. FIG. 9(b) shows that when $N_{active}$ is set to 3, three antennas are activated or operating. FIG. 9(c) shows that when $N_{active}$ is set to 1, one antenna is activated or operating. If the number of activated antennas ($N_{active}$) is less than the total number of antennas (N), operating antennas may be randomly determined, and thus the arrangement structure of the operating antennas may also be randomly determined. However, referring to FIG. 9(b), among the entire antennas, the operating antennas can be determined such that they are arranged in a circular symmetrical pattern, and in this case, coupling between the antennas can be minimized.

Precoder According to the Present Invention

Meanwhile, precoding may be applied to transmitted signals to perform beamforming in a desired direction by using operating antennas. According to the present invention, the precoding may be performed by considering coupling between antennas according to the spacing between antennas to control the beam width depending on the number of operating antennas. For example, if the antenna spacing is sufficiently large (e.g., the antenna spacing is more than the wavelength (of a transmitted wave or signal)), the precoding may be performed without consideration of the antenna coupling. On the contrary, if the antenna spacing is sufficiently small (e.g., the antenna spacing is less than the wavelength (of a transmitted wave or signal)), the antenna coupling may occur, and thus the precoding needs to be performed by considering the coupling.

When the antenna coupling is not considered, the precoding can be performed according to Equation 54. In Equation 54, x is a transmitted signal, z is precoder output, $G^H$ is a precoding matrix, and more particularly, $G^H$ is the complex conjugate transpose matrix of G, and H is a Hermitian operator. In this case, G is a channel vector. For example, when the number of operating antennas is $N_{active}$, G may be a ($1 \times N_{active}$) channel vector. In this specification, when the coupling is not considered, a precoding matrix or precoder may be referred to as a first precoding matrix or precoder.

$$Z = G^H x \qquad \text{[Equation 54]}$$

When the antenna coupling is not considered, the precoding matrix according to the present invention may be determined according to Equation 55. In Equation 55, $\phi_0$ indicates a beamforming direction (e.g., horizontal beam direction), $\lambda$ indicates the wavelength of a transmitted wave or signal, and R indicates the radius of the circular array antenna.

$$G = [g_1 \; g_2 \; \cdots \; g_a] \quad \text{[Equation 55]}$$
$$g_i = e^{j\frac{2\pi}{\lambda} R \cos(\phi_0 - \frac{2\pi i}{a})}, 1 \le i \le a$$
$$a = N_{active}$$

When the antenna coupling is considered, the precoding can be performed according to Equation 56. In Equation 56, x is a transmitted signal, z is precoder output, $C^{-1} G^H$ is a precoding matrix, and $C^{-1}$ is the inverse matrix of C. In this case, G is a channel vector. For example, when the number of operating antennas is $N_{active}$, G may be a $(1 \times N_{active})$ channel vector.

$$z = (C^{-1} G^H)x \quad \text{[Equation 56]}$$

In Equation 56, since $C^{-1} G^H$ is the precoder that considers the antenna coupling, it may be referred to as the decoupling precoder. In addition, in Equation 56, C is a matrix that indicates the antenna coupling. For example, when the number of operating antennas is $N_{active}$, C may be represented as a $(N_{active} \times N_{active})$ matrix. In the decoupling precoder according to the present invention, G may be given according to Equation 55, and C may be given according to Equation 57. In Equation 57, $\lambda$ indicates the wavelength of a transmitted wave or signal, and R indicates the radius of the circular array antenna. In this specification, when the antenna coupling is considered, a precoding matrix or precoder may be referred to as a second precoding matrix or precoder $$C = \begin{bmatrix} c_1 & c_2 & \cdots & c_a \\ c_a & c_1 & \cdots & c_{a-1} \\ \vdots & \vdots & \vdots & \vdots \\ c_2 & \cdots & c_a & c_1 \end{bmatrix} \quad \text{[Equation 57]}$$

$$c_i = \frac{3}{2}\left(\frac{\sin d_i}{d_i} + \frac{\cos d_i}{d_i^2} - \frac{\sin d_i}{d_i^3}\right),$$
$$d_i = \frac{4\pi}{\lambda} R \sin\left(\frac{i\pi}{a}\right), 1 \le i \le a$$
$$a = N_{active}$$

As shown in Equation 57, the matrix C that presents the antenna coupling corresponds to a circulant matrix. A circulant matrix means a matrix where columns are circularly-shifted to the right (or left) in each row. In Equation 57, C is the circulant matrix where columns are circularly-shifted to the right in each row.

The circulant matrix can be decomposed of an inverse Fourier transform (or IFFT) matrix, a diagonal matrix, and a Fourier transform (or FFT) matrix. Here, a diagonal matrix means a matrix where the elements except the elements located at the diagonal (or the elements having the same column and row numbers) are all zero. Thus, the circulant matrix C according to the present invention can be decomposed of the IFFT matrix, diagonal matrix, and FFT matrix as shown in Equation 58.

$$C = [W^{(a)}]^{-1} diag(\sqrt{a}\,[W^{(a)}]^{-1} c^T) W^{(a)} \quad \text{[Equation 58]}$$
$$w_{uv}^{(a)} = \frac{1}{\sqrt{a}} e^{-\frac{j2\pi(u-1)(v-1)}{a}}, 1 \le u \le a, 1 \le v \le a$$
$$c = [c_1 \; c_2 \; \cdots \; c_a]$$

In Equation 58, $[\;]^{-1}$ indicates an inverse matrix, $w_{uv}^{(a)}$ indicates the element at the uth row and with column of the matrix $W^{(a)}$, T indicates the transpose operator, and diag( ) is a function for generating a diagonal matrix by arranging the elements of a vector at the diagonal of the diagonal matrix. In addition, c is the parameter required for controlling coupling between antennas and can be referred to as coupling parameter information or coupling factor information.

When a circulant matrix is used, a diagonal matrix can be obtained by taking the reciprocal of individual diagonal elements of the inverse matrix of C, and an IFFT matrix is the inverse matrix of an FFT matrix, that is, they are in the complex conjugate relationship, whereby the amount of computation can be reduced. For example, Equation 59 shows the circulant matrix of a 3×3 matrix.

$$C = \begin{bmatrix} 4 & 2 & 1 \\ 1 & 4 & 2 \\ 2 & 1 & 4 \end{bmatrix} = \quad \text{[Equation 59]}$$

$$\frac{1}{\sqrt{3}} \begin{bmatrix} 1 & 1 & 1 \\ 1 & e^{\frac{j2\pi}{3}} & e^{\frac{j4\pi}{3}} \\ 1 & e^{\frac{j4\pi}{3}} & e^{\frac{j8\pi}{3}} \end{bmatrix} \times \begin{bmatrix} 7 & 0 & 0 \\ 0 & \frac{5}{2} + j\frac{\sqrt{3}}{2} & 0 \\ 0 & 0 & \frac{5}{2} - j\frac{\sqrt{3}}{2} \end{bmatrix} \times$$

$$\frac{1}{\sqrt{3}} \begin{bmatrix} 1 & 1 & 1 \\ 1 & e^{-\frac{j2\pi}{3}} & e^{-\frac{j4\pi}{3}} \\ 1 & e^{-\frac{j4\pi}{3}} & e^{-\frac{j8\pi}{3}} \end{bmatrix}$$

Compared to the case where the antenna coupling is not considered, when the antenna coupling is considered, a transmitted signal may additionally go through processes such as Fourier transform (or FFT), diagonal multiplication, and inverse Fourier transform (or FFT).

The output z, which is generated through the precoder, may be transmitted via the circular array antenna. Alternatively, additional processing may be applied to the precoder output z before it is inputted to the antenna, and then the generated signal may be transmitted via the circular array antenna.

Figure 10:
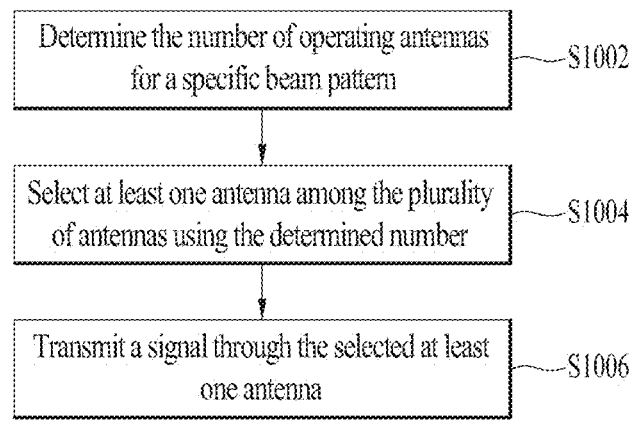
FIG. 10 illustrates a flowchart of the beamforming method according to present invention.

FIG. 10 illustrates a flowchart of the beamforming method according to present invention. The method illustrated in FIG. 10 can be performed by a communication apparatus with a circular array antenna composed of a plurality of antennas (e.g., dipole antennas). However the present invention is not limited thereto, and the method of FIG. 10 can be applied when a other type of array antennas are used.

In step S1002, the number of operating antennas can be determined to form a specific beam pattern for the communication apparatus. The specific beam pattern may be formed such that it covers a specific UE and defined by vertical and horizontal beam widths. As described above, the magnitude of the vertical beam width of the circular array antenna may decrease in proportion to the square root of the number of operating antennas (see Table 1 and Table 2). Therefore, the number of operating antennas among the plurality of antennas included in the circular array antenna may be determined by using the reciprocal of the square of the vertical beam width of the specific beam pattern. For example, assuming that the number of operating antennas is $N_{active}$, since the vertical beam width, $\theta_{BW}$ is in the relationship of $$\theta_{BW} = \frac{K1}{\sqrt{N_{active}}}$$

(where K1 is a constant), $N_{active}$ can be calculated by dividing a constant by the square of the vertical beam width. More specifically, $N_{active}$ may be determined to be equal to or less than the value obtained by dividing the constant by the square of the vertical beam width.

Alternatively, the horizontal beam width of the circular array antenna may decrease in proportion to the number of operating antennas (see Table 1 and Table 2). Thus, the number of operating antennas of the circular array antenna can be determined by using the reciprocal of the horizontal beam width of the specific beam pattern. For example, assuming that the number of operating antennas is $N_{active}$, since the vertical beam width is in the relationship of $$\phi_{BW} = \frac{K2}{N_{active}},$$

$N_{active}$ (where K2 is a constant), $N_{active}$ can be calculated by dividing the constant by the horizontal beam width. More specifically, $N_{active}$ may be determined to be equal to or less than the value obtained by dividing the constant by the horizontal beam width.

When the number of operating antennas is determined, only either the vertical or horizontal beam width of the specific beam pattern may be considered. However, the invention is not limited thereto, and the vertical and horizontal beam widths of the specific beam pattern can be simultaneously considered. In this case, the number of operating antennas may be determined by using the reciprocal of the square of the vertical beam width and the reciprocal of the horizontal beam width. For example, the number $N_{active}$ of operating antennas may be determined such that it is equal to or less than the value obtained by dividing a first constant by the square of the vertical beam width and equal to or less than the value obtained by dividing a second constant by the horizontal beam width.

In step S1002, the number of operating antennas may be determined, for example, as one of the divisors of the total number of antennas included in the circular array antenna. As described above, the number of operating antennas ($N_{active}$) may be determined as one of the divisors of the total number of antennas included in the circular array antenna (N). In this case, the communication apparatus may select one divisor from among the divisors of the total number of antennas within the range that satisfies the vertical beam width and/or horizontal beam width. For example, since it is desirable to minimize the vertical beam width and/or horizontal beam width to reduce interference to another UE, the maximum divisor may be selected from among the divisors of the total number of antennas within the range that satisfies the vertical beam width and/or horizontal beam width. The range that satisfies the vertical beam width and/or horizontal beam width may mean the range where the number of operating antennas is equal to or less than the value obtained by dividing the first constant by the square of the vertical beam width or equal to or less than the value obtained by dividing the second constant by the horizontal beam width.

In step S1004, at least one antenna can be selected from among the plurality of antennas included in the circular array antenna by using the determined number of operating antennas. As described above, among all N antennas, as many antennas as the number of operating antennas ($N_{active}$) can be randomly activated. That is, the number of structures available for the circular array antenna composed of $N_{active}$ antennas may be $$\binom{N}{N_{active}},$$

and among them, a random structure may be selected and used. Here, $$\binom{n}{r}$$

indicates $$\frac{n!}{(n-r)!n!}.$$

Preferably, to minimize coupling between antennas, $N_{active}$ antennas that are arranged in a circular symmetric manner may be selected from among all N antennas. More specifically, when the N antennas are arranged in a circular symmetric manner, if $N_{active}$ is one divisor of N, the $N_{active}$ antennas are also arranged in a circular symmetric manner (see FIG. 9). In this case, the coupling between the operating antennas can be minimized.

In step S1006, the communication apparatus can transmit a signal via the selected at least one antenna. As described above, precoding may be applied to the transmitted signal. In this case, the precoding may be performed based on the number of operating antennas, the horizontal direction of the specific beam pattern, the radius of the circular array antenna, and the wavelength of the transmitted signal. For example, the precoding may be performed according to Equations 54 to 58. More particularly, if the spacing between the operating antennas is equal to or more than half of the wavelength of the transmitted signal, the precoding may be performed according to Equations 54 and 55. As another example, if the spacing between the operating antennas is less than half of the wavelength of the transmitted signal, the precoding may be performed according to Equations 56 to 58.

When the spacing between the operating antennas is less than half of the wavelength of the transmitted signal, the precoding may include: applying the Fourier transform to the transmitted signal; multiplying the Fourier-transformed signal by a diagonal matrix; and applying the Fourier transform to the signal multiplied by the diagonal matrix. In this case, the Fourier transform may be performed by multiplying a Fourier transform (or FFT) matrix, and the inverse Fourier transform may be performed by multiplying an inverse Fourier transform (or IFFT) matrix. For example, the Fourier transform (or FFT) matrix, diagonal matrix, and inverse Fourier transform (IFFT) matrix may be given by Equation 58.

Hereinabove, the beamforming method according to the present invention has been described by dividing it into three steps. However, the invention is not limited thereto. For example, the method according to the present invention may further include other steps which are not shown in FIG. 10, or it may performed by skipping a specific one among the steps shown in FIG. 10. Further, the method according to the present invention may be performed by including all technical principles described in the present specification.

Figure 11:
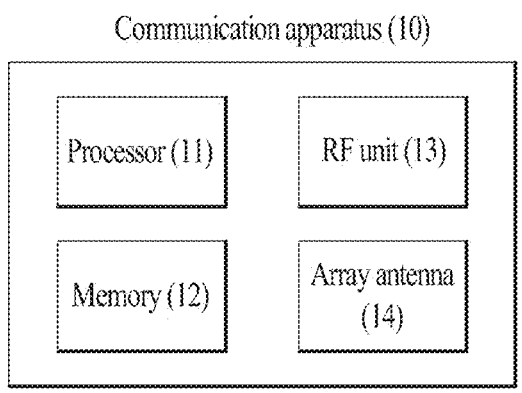
FIG. 11 illustrates a communication apparatus to which the present invention is applicable.

FIG. 11 is a diagram illustrating a communication apparatus to which the present invention is applicable. For example, the communication apparatus illustrated in FIG. 11 may correspond to a base station or a transmission point. Or, the communication apparatus illustrated in FIG. 11 may correspond to a user equipment.

The communication apparatus 10 may comprise a processor 11, a memory 12, a radio frequency (RF) unit 13, and an array antenna 14. The processor 11 may be configured to implement the procedures and/or methods proposed by the present invention. The memory 12 is operatively connected to the processor 11 and stores various information associated with an operation of the processor 11. The RF unit 13 is operatively connected to the processor 11 and the array antenna 14, and transmits/receives a radio signal through the array antenna 14. The array antenna 14 may comprise a plurality of (unit) antennas, and at least one of the plurality of antennas may be designated as an operating antenna.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

Specific operations to be conducted by the base station in the present invention may also be conducted by an upper node of the base station as necessary. In other words, it will be obvious to those skilled in the art that various operations for enabling the base station to communicate with the terminal in a network composed of several network nodes including the base station will be conducted by the base station or other network nodes other than the base station. The term "base station (BS)" may be replaced with a fixed station, Node-B, eNode-B (eNB), or an access point as necessary. The term "terminal" may also be replaced with a user equipment (UE), a mobile station (MS) or a mobile subscriber station (MSS) as necessary.

The embodiments of the present invention may be achieved by various means, for example, hardware, firmware, software, or a combination thereof. In a hardware configuration, an embodiment of the present invention may be achieved by one or more application specific integrated circuits (ASICs), digital signal processors (DSPs), digital signal processing devices (DSDPs), programmable logic devices (PLDs), field programmable gate arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

It will be apparent to those skilled in the art that various modifications and variations can be made in the present invention without departing from the scope of the invention. Thus, it is intended that the present invention cover the modifications and variations of this invention provided they come within the scope of the appended claims and their equivalents.

INDUSTRIAL APPLICABILITY

The present invention is applicable to a wireless communication apparatus such as a user equipment (UE), a base station (BS), a transmission point, etc.

What is claimed is:

1. A method for performing beamforming by using a circular array antenna comprising a plurality of antennas, the method comprising:
   determining a number of operating antennas for a specific beam pattern;
   selecting at least one antenna from among the plurality of antennas by using the determined number of operating antennas; and
   transmitting a signal via the selected at least one antenna,
   wherein determining the number of operating antennas comprises determining the number of operating antennas by using a reciprocal of a square of a vertical beam width of the specific beam pattern.

2. The method of claim 1, wherein determining the number of operating antennas further comprises determining the number of operating antennas by using a reciprocal of a horizontal beam width of the beam pattern.

3. The method of claim 1, wherein the number of operating antennas is determined to be one of divisors of a number of the plurality of antennas included in the circular array antenna.

4. The method of claim 1, wherein transmitting the signal comprises:
   precoding the signal based on the number of operating antennas, a horizontal direction of the beam pattern, a radius of the circular array antenna, and a wavelength of the signal; and
   transmitting the precoded signal via the selected antenna.

5. The method of claim 3, wherein the selected antenna satisfies circular symmetry in the circular array antenna.

6. The method of claim 4, wherein, when a spacing between the operating antennas is equal to or more than a half of the wavelength of the signal, the signal is precoded using the following equations:

$$z = G^H x$$

$$G = [g_1 \; g_2 \; \cdots \; g_a]$$

$$g_i = e^{j\frac{2\pi}{\lambda} R \cos(\phi_0 - \frac{2\pi i}{a})}, \; 1 \le i \le a,$$

where x is the signal, z is the precoded signal, a is the number of operating antennas, $\lambda$ is the wavelength of the signal, $\phi_0$ is the horizontal direction of the beam pattern, R is the radius of the circular array antenna, and $G^H$ is a complex conjugate transpose matrix of G.

7. The method of claim 4, wherein, when the spacing between the operating antennas is less than the half of the wavelength of the signal, precoding the signal comprises:
   performing a Fourier transform on the signal;
   multiplying the Fourier-transformed signal by a diagonal matrix; and
   performing the Fourier transform on the signal multiplied by the diagonal matrix.

8. The method of claim 4, wherein, when the spacing between the operating antennas is less than the half of the wavelength of the signal, the signal is precoded according to the following equations:

$$z = (C^{-1} G^H)x$$

$$G = [g_1 \ g_2 \ \cdots \ g_a]$$

$$g_i = e^{\frac{j2\pi}{\lambda} R \cos\left(\phi_0 - \frac{2\pi i}{a}\right)}, 1 \le i \le a$$

$$C = \begin{bmatrix} c_1 & c_2 & \cdots & c_a \\ c_a & c_1 & \cdots & c_{a-1} \\ \vdots & \vdots & \vdots & \vdots \\ c_2 & \cdots & c_a & c_1 \end{bmatrix}$$

$$c_i = \frac{3}{2}\left(\frac{\sin d_i}{d_i} + \frac{\cos d_i}{d_i^2} - \frac{\sin d_i}{d_i^3}\right), d_i = \frac{4\pi}{\lambda} R \sin\left(\frac{i\pi}{a}\right), 1 \le i \le a,$$

where x is the signal, z is the precoded signal, a is the number of operating antennas, $\lambda$ is the wavelength of the signal, $\phi_0$ is the horizontal direction of the beam pattern, $G^H$ is a complex conjugate transpose matrix of G, and $C^{-1}$ is an inverse matrix of C.

9. The method of claim 7, wherein the Fourier transform is performed by using an a×a Fast Fourier Transform (FFT) matrix, and wherein an element $w_{uv}^{(a)}$ at the u-th row and v-th column of the FFT matrix is given by the following equation:

$$w_{uv}^{(a)} = \frac{1}{\sqrt{a}} e^{-\frac{j2\pi(u-1)(v-1)}{a}}, 1 \le u \le a, 1 \le v \le a.$$

10. The method of claim 9, wherein the diagonal matrix is given by the following equations:

$$\mathrm{diag}(\sqrt{a}[W^{(a)}]^{-1} c^T)$$

$$c = [c_1 c_2 \ldots c_a]$$

where $W^{(a)}$ is the FFT matrix, T is a transpose operator, and diag( ) is a function for generating a diagonal matrix by arranging elements of a vector at diagonal positions of the diagonal matrix.

11. A communication apparatus for performing beamforming, the communication apparatus comprising:
   a circular array antenna comprising a plurality of antennas; and
   a processor,
   wherein the processor is configured to:
   determine a number of operating antennas corresponding to a beam pattern for the beamforming;
   select as many antennas as the number of operating antennas from among the plurality of antenna;
   transmit a signal via the selected antennas,
   wherein determining the number of operating antennas comprises determining the number of operating antennas by using a reciprocal of a square of a vertical beam width of the beam pattern.

* * * * *